(12) United States Patent
Takagi

(10) Patent No.: US 7,953,318 B2
(45) Date of Patent: May 31, 2011

(54) IMAGING APPARATUS AND FOCUSING METHOD

(75) Inventor: Masaaki Takagi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 336 days.

(21) Appl. No.: 12/058,395

(22) Filed: Mar. 28, 2008

(65) Prior Publication Data

US 2008/0240700 A1 Oct. 2, 2008

(30) Foreign Application Priority Data

Mar. 28, 2007 (JP) ................................. 2007-084693

(51) Int. Cl.
 *G03B 13/00* (2006.01)
(52) U.S. Cl. .......................................... 396/98; 396/106
(58) Field of Classification Search .................... 396/88, 396/87, 98, 106, 120
 See application file for complete search history.

(56) References Cited

U.S. PATENT DOCUMENTS

| | | | | |
|---|---|---|---|---|
| 6,748,167 | B2 * | 6/2004 | Yoshida et al. | 396/106 |
| 6,928,240 | B2 * | 8/2005 | Miwa | 396/106 |
| 6,944,397 | B2 * | 9/2005 | Miwa | 396/106 |
| 7,587,094 | B2 * | 9/2009 | Fujiwara et al. | 382/254 |
| 2003/0179307 | A1 * | 9/2003 | Kawanishi et al. | 348/333.09 |
| 2004/0001158 | A1 * | 1/2004 | Aoki | 348/345 |
| 2005/0052553 | A1 * | 3/2005 | Kido et al. | 348/296 |
| 2006/0152617 | A1 * | 7/2006 | Konishi | 348/345 |
| 2008/0031611 | A1 * | 2/2008 | Konishi | 396/102 |

FOREIGN PATENT DOCUMENTS

| | | |
|---|---|---|
| JP | 08-160489 A | 6/1996 |
| JP | 2001-166200 A | 6/2001 |
| JP | 2002-341230 A | 11/2002 |

OTHER PUBLICATIONS

Machine translation of JP2002-341230 A.*

* cited by examiner

*Primary Examiner* — Christopher E Mahoney
*Assistant Examiner* — Linda B Smith
(74) *Attorney, Agent, or Firm* — Sughrue Mion, PLLC

(57) ABSTRACT

Unless a release button is pressed halfway to input a command to prepare for capturing a still image, a focus lens is moved at predetermined intervals to focus roughly on a subject. When the release button is pressed halfway, the present position of the focus lens is detected. If the position of the focus lens is closer to a lens terminal on a short shooting distance side, the focus lens is moved from the lens terminal on the short shooting distance side toward a lens terminal on a long shooting distance side. If the position of the focus lens is closer to the lens terminal on the long shooting distance side, the focus lens is moved from the lens terminal on the long shooting distance side toward the opposite lens terminal. When an in-focus position is detected while the focus lens is being moved, the focus lens is immediately set at the in-focus position.

18 Claims, 22 Drawing Sheets

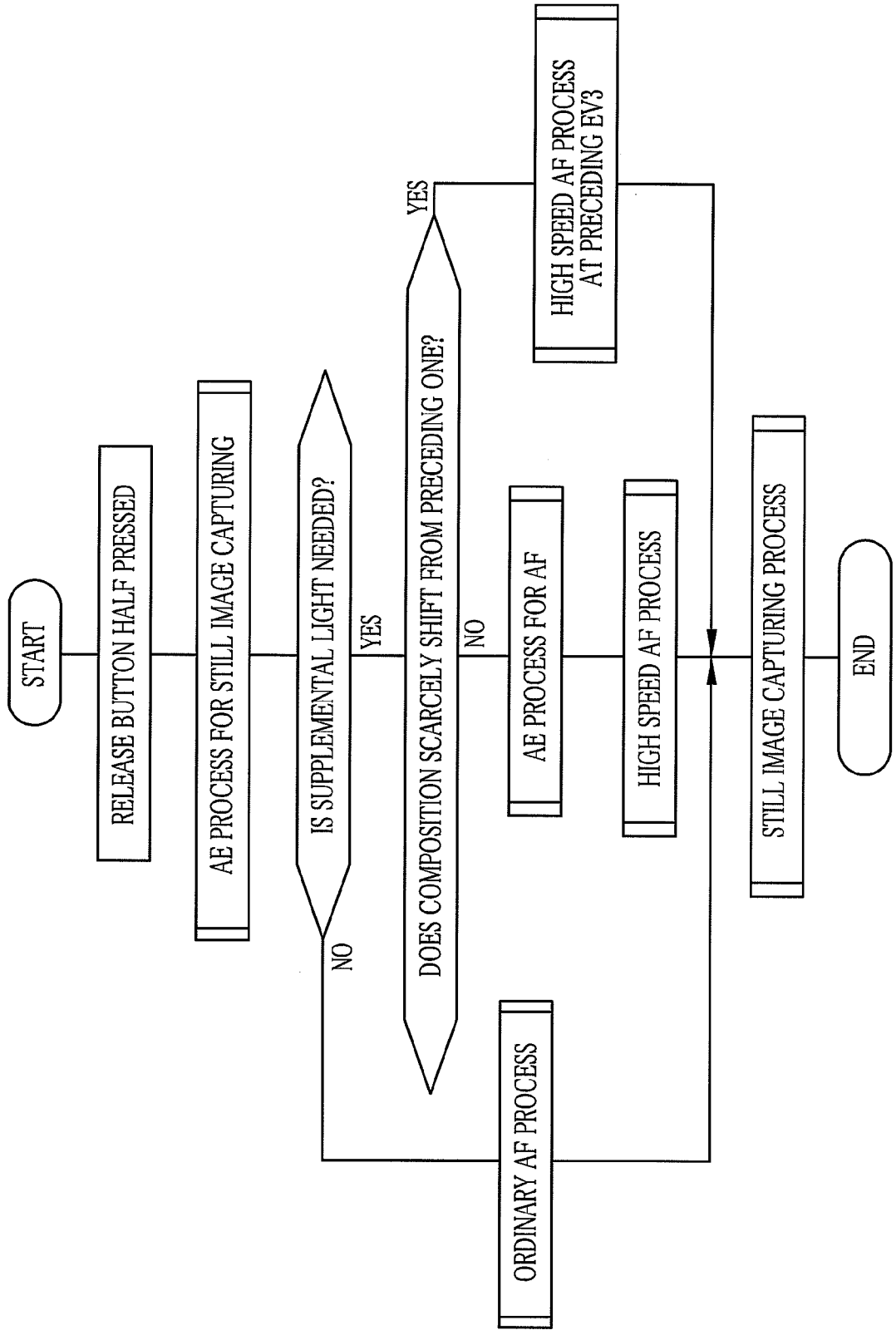

IMAGING APPARATUS AND FOCUSING METHOD

FIELD OF THE INVENTION

The present invention relates to an imaging apparatus that automatically focuses its imaging lens system on a subject, and a focusing method for the imaging lens system.

BACKGROUND OF THE INVENTION

Most of imaging apparatuses, including photographic film cameras and digital cameras that record electronic images in storage media, are provided with a focus control device for focusing an imaging lens on a subject automatically. There are various types of auto-focusing (AF) methods. Conventional digital cameras mostly adopt TTL contrast detection method, making use of an image sensor that is primarily used to take the electronic images.

In the AF process according to the TTL contrast detection method, image signals are obtained through the image sensor while moving a focus lens of the imaging lens step by step. Then, high frequency components of the image signals are integrated at each step of the focus lens. The integrated value is compared with other integrated values as obtained at different focus lens positions. Where the imaging lens is just focused on the subject, the contrast of the optical image of the subject gets the peak, and the integrated value becomes the highest. Thus, the in-focus position is detected with reference to the image contrast.

However, the contract detection method has a disadvantage that if the subject brightness is low the difference in contrast between the individual focus lens positions becomes too small to detect the in-focus position. To compensate for the disadvantage, some prior arts suggest projecting a supplemental light toward the low brightness subject, to raise the subject brightness and thus enhance the difference in contrast between the different focus lens positions, to enable detection of the in-focus position.

JPA 2002-341230 discloses an imaging apparatus, which makes a judgment as to whether the supplemental light is necessary for the AF process or not on the basis of a subject brightness value measured without the supplemental light. Thereafter when the supplemental light is projected, and if it raises the subject brightness too much to detect the in-focus position, the imaging apparatus of this prior art prohibits imaging. JPA 1996-160489 discloses an imaging apparatus, which projects a supplemental light to calculate a subject distance based on an incident position of the supplemental light on an image sensor as it is reflected from the subject toward the image sensor. Then a first flashlight is projected at an intensity decided by the subject distance. Based on the reflected amount of the first flashlight, the amount of a second flashlight is decided to make a proper exposure.

Since the in-focus position is detected as the position where the image contrast gets the peak while shifting the position of the focus lens step by step, it sometimes takes a certain time to detect the in-focus position. That is, the focusing time can be relatively long in the conventional TTL contrast detection method. In order to save the focusing time, an imaging apparatus as disclosed in JPA 2001-166200 divides the whole focusable subject distance range, i.e. from the shortest shooting distance to the infinity, into several distance zones so that the contrast detection AF process is executed within a chosen one of the divided distance zones. The choice of the distance zone is made on the basis of a difference between a subject brightness value measured without a supplemental light and a subject brightness value measured under the supplemental light.

In the above-mentioned method, as the contrast detection is carried out only in one of the divided distance zones, the focusing time can be saved if the subject actually exists in the chosen distance zone. However, if the subject does not exist in the chosen distance zone, the contrast detection is carried out again in another distance zone that is chosen in a sequence from more relevant zone to less relevant zone to the information on the measured subject brightness values. In that case, each time the distance zone for the contrast detection is switched over, the focus lens must be set to the initial position of the chosen distance zone. As a result, the focusing time is rather elongated.

SUMMARY OF THE INVENTION

In view of the foregoing, a primary object of the present invention is to provide an imaging apparatus and a focusing method for an imaging lens, which make it possible to detect the in-focus position efficiently and thus save the focusing time.

An imaging apparatus of the present invention comprises an imaging lens system including a focus lens for adjusting its focal point by moving the focus lens along an optical axis; a lens position detector for detecting the position of the focus lens on the optical axis; an operating member for inputting a command to prepare for capturing a still image; a first focus control device for focusing the imaging lens system on a subject by moving the focus lens at predetermined intervals while the operating member is not operated; and a second focus control device for focusing the imaging lens system on the subject by moving the focus lens in response to the command inputted through the operating member, wherein the second focus control device decides an initial position and a direction to move the focus lens depending upon the position of the focus lens detected by the lens position detector at the time the operating member is operated, and moves the focus lens to detect an in-focus position of the focus lens by evaluating focusing condition of the imaging lens system at respective steps of the focus lens.

Another imaging apparatus of the present invention comprises an imaging lens system including a focus lens for adjusting its focal point by moving the focus lens along an optical axis; a lens position detector for detecting the position of the focus lens on the optical axis; an operating member for inputting a command to prepare for capturing a still image; a first focus control device for focusing the imaging lens system on a subject by moving the focus lens at predetermined intervals while the operating member is not operated; a second focus control device for focusing the imaging lens system on the subject by moving the focus lens in response to the command inputted through the operating member; a light projector for projecting an illumination light toward the subject to help the second focus control device detect the in-focus position; and a brightness detector for detecting a first subject brightness value without the illumination light and a second subject brightness value under the illumination light in response to an operation on the operating member, wherein the second focus control device decides an initial position and a direction to move the focus lens depending upon the position of the focus lens detected by the lens position detector at the time the operating member is operated as well as a relation in magnitude between the first and second subject brightness values, and moves the focus lens to detect an in-focus position of the focus lens by evaluating focusing condition of the imaging lens system at respective steps of the focus lens.

The imaging apparatus preferably comprises an image sensor for converting an optical image of the subject obtained through the imaging lens system into electronic image signals, wherein the second focus control device evaluates the focusing condition on the basis of the image signals.

According to a preferred embodiment, the imaging apparatus further comprises a memory for memorizing the initial position and the direction to move the focus lens as decided by the second focus control device; and a judging device for judging whether a present image composition obtained through the image sensor in response to a present operation on the operating member approximates a preceding image composition obtained in response to a preceding operation on the operating member, wherein when the judging device judges that the present image composition approximates the preceding image composition, the second focus control device decides the initial position and the direction to move the focus lens with reference to the initial position and the direction as decided in response to the preceding operation on the operating member and memorized in the memory.

According to the present invention, a focusing method for an imaging lens system including at least a focus lens movable along an optical axis, comprises steps of:

focusing the imaging lens system on a subject by moving the focus lens at predetermined intervals while a command to prepare for capturing a still image is not inputted through an operating member;

detecting the position of the focus lens on the optical axis when the operating member is operated to input the command;

deciding an initial position and a direction to move the focus lens depending upon the position of the focus lens detected at the time the operating member is operated;

moving the focus lens from the decided initial position in the decided direction;

evaluate focusing condition of the imaging lens system at respective steps of the focus lens, to detect an in-focus position of the focus lens to the subject; and setting the focus lens to the detected in-focus position.

When the detected position of the focus lens is closer to a first lens terminal on a short shooting distance side than a second lens terminal on a long shooting distance side, the first lens terminal is decided to be the initial position and the focus lens is moved from the first lens terminal toward the second lens terminal, whereas when the detected position of the focus lens is closer to the second lens terminal than the first lens terminal, the second lens terminal is decided to be the initial position and the focus lens is moved from the second lens terminal toward the first lens terminal.

Another focusing method of the present invention, for focusing an imaging lens system including a focus lens movable along an optical axis, comprises steps of:

focusing the imaging lens system on a subject by moving the focus lens at predetermined intervals while a command to prepare for capturing a still image is not inputted through an operating member;

detecting the position of the focus lens on the optical axis when the operating member is operated to input the command;

projecting an illumination light toward the subject in response to the operation on the operating member;

detecting a first subject brightness value without the illumination light and a second subject brightness value under the illumination light;

deciding an initial position and a direction to move the focus lens depending upon the position of the focus lens detected at the time the operating member is operated as well as a relation in magnitude between the first and second subject brightness values;

moves the focus lens from the decided initial position in the decided direction;

evaluate focusing condition of the imaging lens system at respective steps of the focus lens, to detect an in-focus position of the focus lens to the subject; and setting the focus lens to the detected in-focus position.

According to a preferred embodiment, when the second subject brightness value under the illumination light is more than the first subject brightness value without the illumination light, or when the second subject brightness value is not more than the first subject brightness value and the detected position of the focus lens is closer to a first lens terminal on a short shooting distance side than a second lens terminal on a long shooting distance side, the first lens terminal is decided to be the initial position and the focus lens is moved from the first lens terminal toward the second lens terminal, whereas when the detected position of the focus lens is closer to the second lens terminal than the first lens terminal, the second lens terminal is decided to be the initial position and the focus lens is moved from the second lens terminal toward the first lens terminal.

According to another preferred embodiment, the initial position and the direction to move the focus lens are chosen from among a first focusing movement from a first lens terminal on a short shooting distance side toward a second lens terminal on a long shooting distance side, a second focusing movement from the second lens terminal toward the first lens terminal, and a third focusing movement from a lens position for border zone toward the second lens terminal, wherein the lens position for border zone corresponds to a shooting distance beyond which the illumination light cannot effectively reach.

According to another preferred embodiment, the focusing method further comprising steps of memorizing the initial position and the direction to move the focus lens as decided in response to a preceding operation on the operating member; and judging whether a present image composition obtained in response to a present operation on the operating member approximates a preceding image composition obtained in response to the preceding operation on the operating member, whereby when it is judged that the present image composition approximates the preceding image composition, the initial position and the direction to move the focus lens are decided with reference to the memorized initial position and direction.

For the judgment as to whether the present image composition approximates the preceding image composition, the focusing method further comprises steps of calculating a difference between the first subject brightness value as detected in response to the present operation on the operating member and the first subject brightness value as detected in response to the preceding operation on the operating member; and measuring length of time passed from a predetermined action responsive to the preceding operation on the operating member to the present operation on the operating member, whereby the proximity between the present image composition and the preceding image composition is judged on the basis of the length of passed time and the difference between the first subject brightness values.

According to a preferred embodiment, the focusing method further comprises a step of checking whether an in-focus position was detected in response to the preceding operation on the operating member. When it is determined that the in-focus position was detected in response to the preceding operation and that the present image composition approximates the preceding image composition, the focus lens is moved from the same initial position in the same direction as decided in response to the preceding operation on the operating member. On the contrary, when it is determined that no in-focus position was detected in response to the preceding operation and that the present image composition approximates the preceding image composition, the focus lens is moved from a different initial position in a different direction from those decided in response to the preceding operation on the operating member.

According to the present invention, the initial position and the direction of the focusing movement of the focus lens for detecting the in-focus position are decided depending upon the position of the focus lens detected at the time when the operating member such as a release button is operated to input the command to prepare for capturing a still image, and eventually the difference between the subject brightness without the illumination light and the subject brightness under the illumination light. As the focus lens is being moved to focus on the subject even while the operating member is not operated, the position of the focus lens detected at the time when the operating member is operated reflects the subject distance. Also, whether the illumination light projected from the imaging apparatus raises the subject brightness or not depends on the subject distance to some degree. Therefore, starting the focusing movement of the focus lens from the initial position that is closer to the present focus lens position not only saves the time taken to move the focus lens to the initial position, but also reduce the time to find or reach the in-focus position.

BRIEF DESCRIPTION OF THE DRAWINGS

The objects and advantages of the present invention will be more apparent from the following detailed description of the above and other preferred embodiments when read in connection with the accompanied drawings, wherein like reference numerals designate like or corresponding parts throughout the several views, and wherein:

FIG. 22 is a flowchart illustrating a sequence of procedures the digital camera executes in response to a half-pressing operation on the release button, wherein the AE process for AF is skipped if the present composition is held to approximate the preceding composition.

DESCRIPTION OF THE PREFERRED EMBODIMENTS

Figure 1:
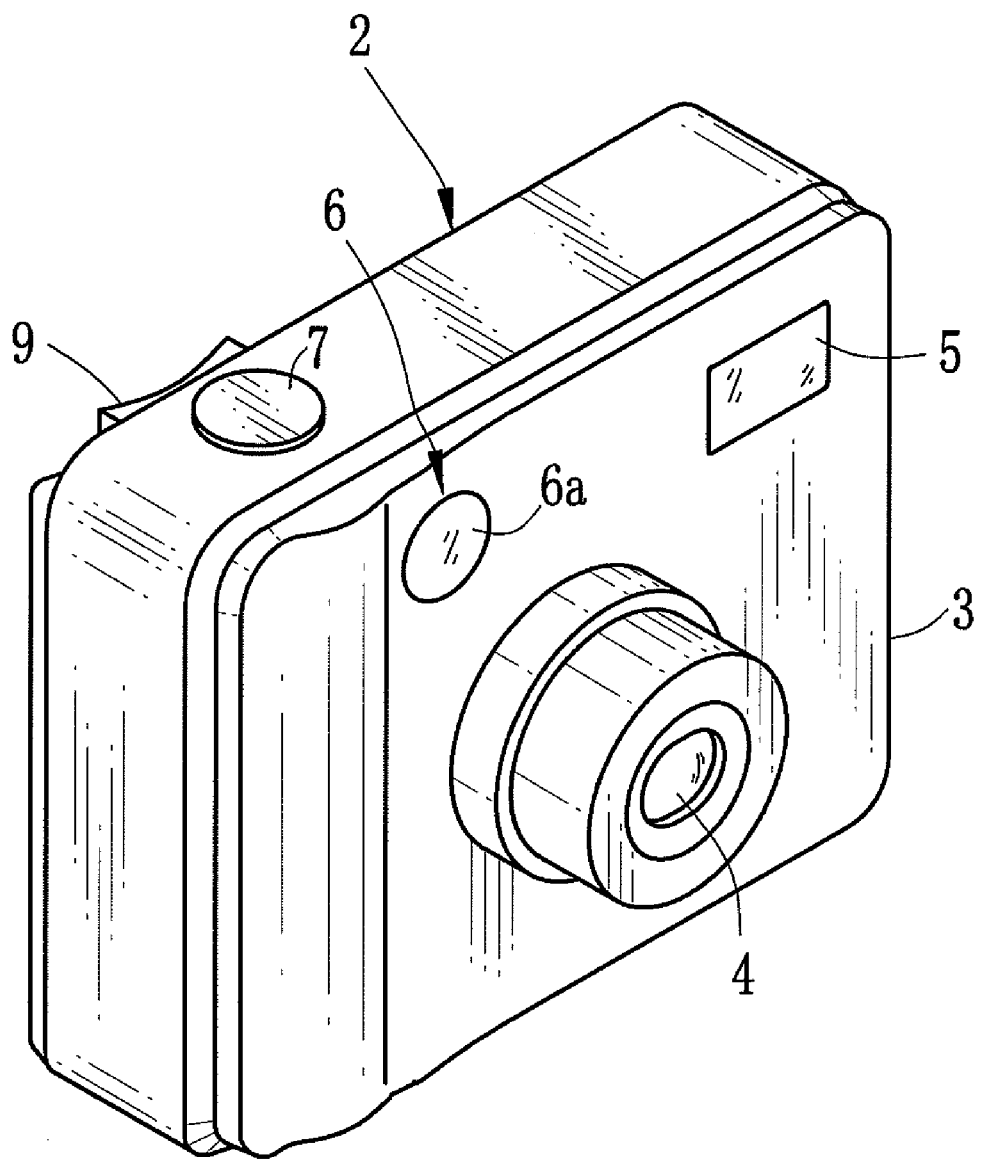
FIG. 1 is a front perspective view of a digital camera according to an embodiment of the present invention.

A digital camera 2 shown in FIG. 1 has on its front an imaging lens 4, a flash projector 5 and a supplemental light projector window 6a of a supplemental light projector 6. The digital camera 2 has a release button 7 on its top, and an LCD 8 (see FIG. 2) and operating members like a zoom button 9 on its back.

The imaging lens 4 is a varifocal lens system that can change its focal length from a longest telephoto terminal value to a shortest wide-angle terminal value by operating the zoom button 9. The imaging lens 4 also changes its f-number (full aperture f-number) corresponding to its focal length, as the f-number represents a ratio of the focal length to an effective aperture value. That is, the f-number increases as the focal length gets longer.

The release button 7 is operated in two steps, i.e. to a half-pressed position and then to a full-pressed position. While the release button 7 is not operated in an imaging mode, the LCD 8 displays continuous images of subjects located in a shooting field, so-called camera-through images.

When the release button 7 is pressed halfway, preparatory processes are executed, including an AE (auto exposure) process for deciding an exposure value for capturing a still image from a subject and an AF (auto focus) process for focusing the imaging lens 4 on the subject. In the AE process, subject brightness is measured, and a shutter speed and an aperture value are decided according to the measured subject brightness. As will be described in detail, the preparatory processes eventually include an additional AE process for AF if it is necessary to project AF supplemental light from the supplemental light projector window 6a for the benefit of the AF process. The AE process for AF is carried out after the AE process for still image capturing and before the AF process.

When the release button 7 is pressed fully after the preparatory processes, a still image capturing process is executed to capture a still image at the shutter speed and the aperture value, which have been decided by the AE process for still image capturing. The captured still image is converted into digital image data and recorded in a removable memory card 10 (see FIG. 2).

Note that the release button 7 is not limited to the above-described two-step type. In that case, it is also possible to carry out the AE process for still image capturing, the AE process for AF and the AF process sequentially upon each operation on the release button 7.

The flash projector 5 projects a flashlight toward the subject synchronously with the capturing of the still image if it is judged to be necessary by the subject brightness. The supplemental light projector 6 projects the AF supplemental light from the supplemental light projector window 6a toward the subject, to raise the subject brightness up to a sufficient level for the AF process, as set forth in detail later.

Although the supplemental light projector 6 is provided as a specific device for projecting the supplemental light only in the present embodiment, it is possible to project the supplemental light from a light emitting device that is originally provided for another purpose. For example, the supplemental light may be projected from the flash projector 5 or a light source that is provided for projecting light to facilitate framing in a dark place.

Figure 2:
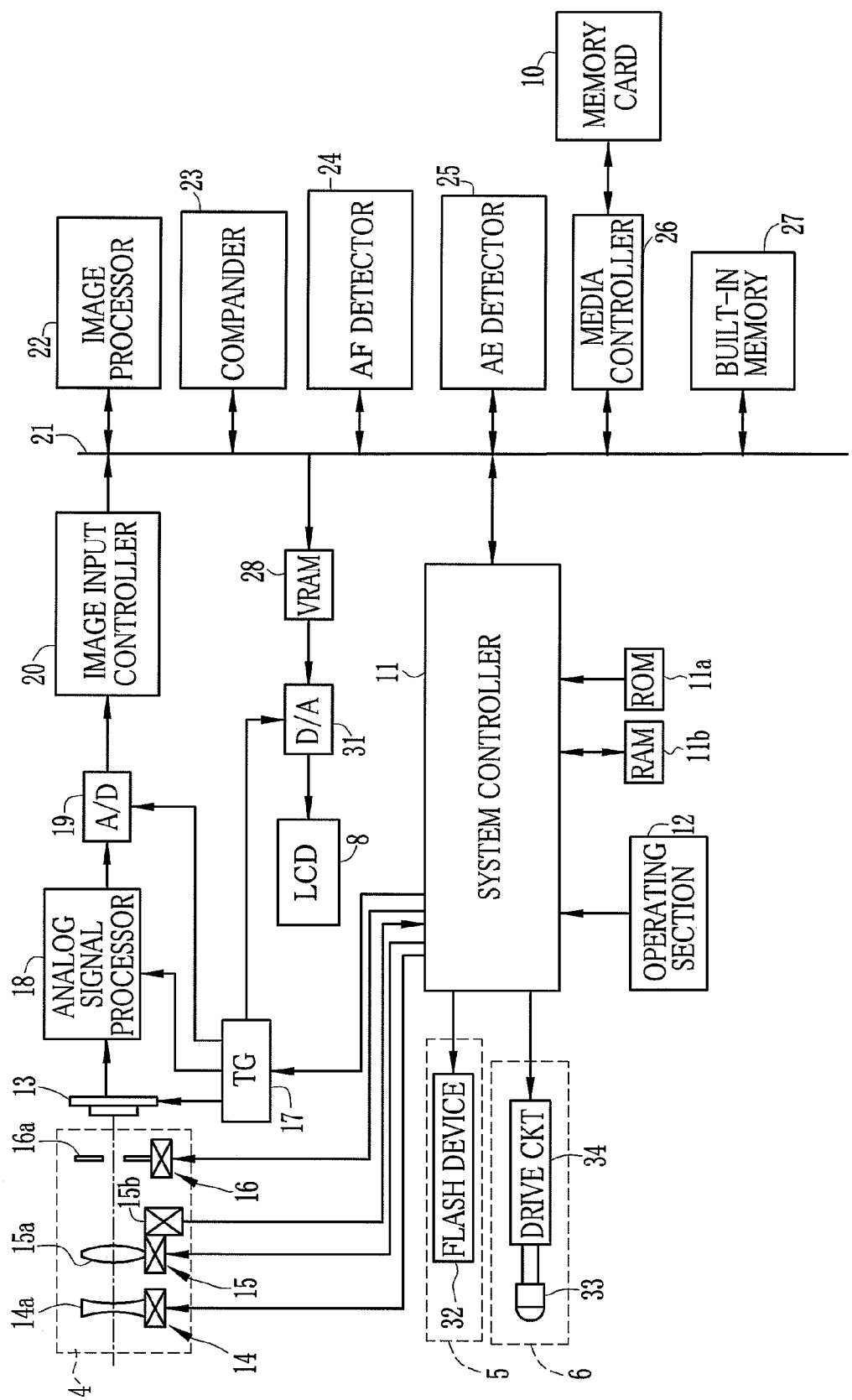
FIG. 2 is a block diagram illustrating an internal structure of the digital camera.

Referring to FIG. 2 showing the internal structure of the digital camera 2, a system controller 11 controls respective components of the digital camera 2 in response to operational signals entered through an operating section 12 including the release button 7 and the zoom button 9. The system controller 11 is connected to ROM 11a and RAM 11b. The ROM 11a stores programs and parameters for the system controller 11 to control the respective components, whereas the RAM 11b is used to write data necessary for the processing temporarily.

An image sensor 13 is located behind the imaging lens 4, so the imaging lens 4 forms an optical image of the subject on a photoreceptive surface of the image sensor 13. A zooming mechanism 14 for adjusting the focal length of the imaging lens 4, a focusing mechanism 15 for focusing the imaging lens 4, and a stop mechanism 16 for adjusting amount of light falling on the image sensor 13 are integrally mounted in the imaging lens 4.

The zooming mechanism 14 changes the focal length by moving a zoom lens 14a, an element of the imaging lens 4, along an optical axis of the imaging lens 4 in response to the operation on the zoom button 9. The zooming mechanism 14 consists of the zoom lens 14a, a not-shown pulse motor, a not-shown motor driver and other minor members. The zoom lens 14a is movable between a telephoto terminal and a wide-angle terminal, which correspond to the longest telephoto terminal value and the shortest wide-angle terminal value of the focal length of the imaging lens 4.

The imaging lens 4 is focusable to any subject located in a shooting distance range from a predetermined shortest shooting distance to infinity. The focusing mechanism 15 consists of a focus lens 15a, and a not-shown pulse motor, a not-shown motor driver and other minor members for moving the focus lens 15a along the optical axis of the imaging lens 4 to adjust the focus of the imaging lens 4 to the subject. The focusing mechanism 15 may have any conventional structure, and the focus lens 15a may consist of several lens elements.

The digital camera 2 adopts a contrast peak detection method for the AF process, like the above-mentioned prior art. As well-known in the art, a peak contrast value of an optical image formed on the image sensor 13 is detected based on the change in contrast between several steps of the focus lens 15a around a position at which the contrast gets the peak. Therefore, the contrast of the image must be detected even at such positions of the focus lens 15a that are outside a moving range of the focus lens 15a from a position corresponding to the predetermined shortest shooting distance and a position corresponding to the infinity.

For this reason, a terminal position of the focus lens 15a, which is used as an initial position for starting moving to detect whether the imaging lens 4 is in focus to a subject at the predetermined shortest shooting distance, is shifted several steps from the lens position corresponding to the shortest shooting distance toward the shorter shooting distance side. Likewise, an opposite terminal position of the focus lens 15a is shifted several steps from the lens position corresponding to the infinity toward the longer shooting distance side, and the opposite terminal position is used as an initial position for the focus lens 15a to start moving to detect whether the imaging lens 4 is in focus to a subject in the infinity range. Thus, the focus lens 15a is movable between the lens terminal on the short shooting distance side and the opposite lens terminal on the long shooting distance side.

The focusing mechanism 15 is provided with a lens position detector 15b. For example, the lens position detector 15b detects the position of the focus lens 15a on the basis of the number of drive pulses supplied to the pulse motor for the focus lens 15a and the rotational direction of the pulse motor. Data of the lens position detected by the lens position detector 15b is sent to the system controller 11, for use in controlling driving the focus lens 15a.

The lens position detector 15b may detect the position of the focus lens 15a in another appropriate way. For example, in a case where the temperature properties of the imaging lens 4 makes it hard to detect the lens position exactly by the number of drive pulses alone, it is desirable to mount a thermistor to the imaging lens 4, to correct the lens position based on the temperature of the imaging lens 4. In a case where the focusing mechanism 15 uses a linear actuator that does not control the lens position by the number of drive pulses, it is possible to detect the lens position by a hall element or the like.

The stop mechanism 16 is constituted of iris membranes 16a forming a stop aperture on the optical axis of the imaging lens 4 and an actuator for driving the iris membranes 16a. By changing the size of the stop aperture, the stop mechanism 16 adjusts the amount of light incident on the image sensor 13.

The image sensor 13 is a CCD image sensor or an MOS image sensor or the like, which has a large number of light receiving elements arranged in an array on a photoreceptive surface, which are also called sensor pixels. The image sensor 13 is driven by various drive signals from a timing generator 17, so the light receiving elements accumulate electric charges whose amount corresponds to the light amounts incident on the respective light receiving elements and output the accumulated charges at designated timing. Thereby the optical image of the subject, which is formed on the image sensor 13, is converted into an analog image signal.

The image sensor 13 has a function of an electronic shutter to adjust charge accumulation time that can be called exposure time. The electronic shutter function is to sweep out the electric charges accumulated so far each time an electronic shutter pulse is received from the timing generator 17. Thereby, the charge accumulation time during a frame period is adjusted. So the exposure time, namely the shutter speed of the electronic shutter, is adjusted by adjusting the timing of inputting the electronic shutter pulse. In the illustrated embodiment, the exposure value is decided by the electronic shutter speed of the image sensor 13 and the aperture value of the stop mechanism 16 in combination.

As the system controller 11 sets up the timing generator 17 with various parameters for making various operations at predetermined timings, the timing generator 17 generates the drive signals for driving the image sensor 13 and synchronizing signals for synchronized operations of the respective components. According to the parameters set up in the timing generator 17, the electronic shutter speed of the image sensor 13 as well as frame rate of the image sensor 13, i.e. the rate of repetition of charge accumulation and output, are changed. In the present embodiment, the set up parameters get effective in the next frame period.

The image signal from the image sensor 13 is sent to an analog signal processor 18. The analog signal processor 18 consists of a correlated double sampling circuit and an amplification circuit, so it makes the correlated double sampling and amplification of the image signal in synchronism with the output or reading of the accumulated charges from the image sensor 13. The analog image signal output from the analog signal processor 18 is converted through an A/D converter 19 into digital image data.

The image data is sent from the A/D converter 19 to an image input controller 20. The image input controller 20 controls input of the image data to a data bus 21. The data bus 21 is connected to the system controller 11, an image processor 22, a compander 23, an AF detector 24, an AE detector 25, a media controller 26, a built-in memory 27 and a VRAM 28, so these components are controlled by the system controller 11 and exchange data through the data bus 21.

The image processor 22 processes the image data for color compensation, gamma correction, white-balance correction, YC conversion and the like. The compander 23 compresses the image data according to a predetermined compression format, e.g. JPEG format, before writing the image data in the memory card 10. The compander 23 also expand or decompress the image data as being read out from the memory card 10.

The AF detector 24 constitutes together with the system controller 11 a first focus control device and a second focus control device, which are recited in the appended claims. For the sake of auto-focusing of the imaging lens 4, the AF detector 24 extracts high frequency components from a fragment of the image data output from the image input controller 20, the fragment corresponds to a predetermined AEAF detection area within an image frame defined on the image sensor 13. The AF detector 24 integrates the extracted high frequency components to output the integrated value as an AF evaluation value to the system controller 11. Based on the AF evaluation value, the system controller 11 makes an AF process for focusing the imaging lens 4 on a subject whose image is formed in the AEAF detection area.

The AE detector 25 is a brightness detection device for detecting subject brightness on the basis of the image signal from the image sensor. Specifically, the AE detector 25 detects a subject brightness value of the AEAF detection area on the basis of the image data from the image input controller 20. The detected subject brightness value is sent to the system controller 11, so the system controller 11 decides the shutter speed of the image sensor 13 and the aperture value of the stop mechanism 16 on the basis of the subject brightness value.

Although the AEAF detection area is a predetermined area within the image frame in the present embodiment, it is possible to discriminate a human face area on the basis of the image data, and serve the human face area as the AEAF detection area.

The media controller 26 controls reading and writing of the memory card 10. After being processed through the image processor 22 and the compander 23, the image data to record is sent to the media controller 26 and written in the memory card 10. The media controller 26 reads the image data from the memory card 10, and the compander 23 decompresses the image data.

The built-in memory 27 is served as a work memory for writing the image data and other data temporarily while they are being processed in the image processor 22. The VRAM 28 is for writing data of an image to be displayed on the LCD 8. A D/A converter 31 reads out the image data from the VRAM 28 at predetermined intervals, and convert it into an analog image signal for driving the LCD 8.

In the imaging mode, the image sensor 13 repeats the image-capturing process, and the image data is written frame by frame in the VRAM 28. Thereby, the camera-through images are displayed on the LCD 8. In a reproduction mode, the image data is read out from the memory card 10, decompressed and written in the VRAM 28, so the images recorded in the memory card 10 are displayed on the LCD 8.

While the camera-through images are being displayed, the system controller 11 controls the focus lens 15a to move slightly at predetermined intervals, to detect the AF evaluation values, and detect the in-focus position at which the image contrast becomes the maximum on the basis of the AF evaluation values. Then the focus lens 15a is set to the detected in-focus position.

A flash device 32 consists of a flash discharge tube that is integrated in the flash projector 5, and a circuit for causing the flash discharge tube to emit light. The flash device 32 is controlled by the system controller 11.

The supplemental light projector 6 consists of an LED 33 and a drive circuit 34 for the LED 33. The drive circuit 34 is controlled by the system controller 11, to drive the LED 33 to emit light at a constant intensity when the subject brightness is under a predetermined level. The light from the LED 33 is projected as the AF supplemental light from the supplemental light projector window 6a toward the subject.

The AF supplemental light is projected to cover the whole AEAF detection area on the object side. The reference subject brightness level for judging whether to project the supplemental light is determined depending upon whether the contrast of the image of the subject can be detected with sufficient accuracy under that subject brightness level. In other words, it is determined depending upon whether the in-focus position can be detected with sufficient accuracy or not. Namely, the threshold level of the subject brightness for judging whether to project the supplemental light is not necessarily equal to a subject brightness level for judging whether to project the flash light.

The AE process for still image capturing is a process for deciding an exposure value for capturing a still image, and is executed in response to the half-pressing of the release button 7. In the AE process for still image capturing, as the image sensor 13 has a narrower dynamic range than an overall subject brightness range that covers up different brightness levels of a variety of possible scenes, the overall subject brightness range is divided range into several measurement ranges that is not wider than the dynamic range of the image sensor 13 and the image sensor 13 measures the subject brightness in the respective measurement ranges.

The AE process for AF is to decide an exposure value for carrying out the AF process under the illumination with the AF supplemental light. The AE process for AF is carried out when the subject brightness measured on the AE process for still image capturing is under the predetermined level. In the AE process for AF, a subject brightness value of the AEAF detection area is detected based on the image data that is obtained by exposing the image sensor 13 while the subject is illuminated with the AF supplemental light, and the subject brightness value (light value: LV) of the AEAF detection area is used as an exposure value (EV) for deciding the shutter speed and the aperture value.

Since the subject is illuminated with the AF supplemental light in the AE process for AF, the detected subject brightness value is expected to be higher than that measured on AE process for still image capturing. Therefore, the system controller 11 makes an exposure using an exposure value that is shifted to the pulse side from an exposure value that is obtained by the AE process for still image capturing.

Figure 3:
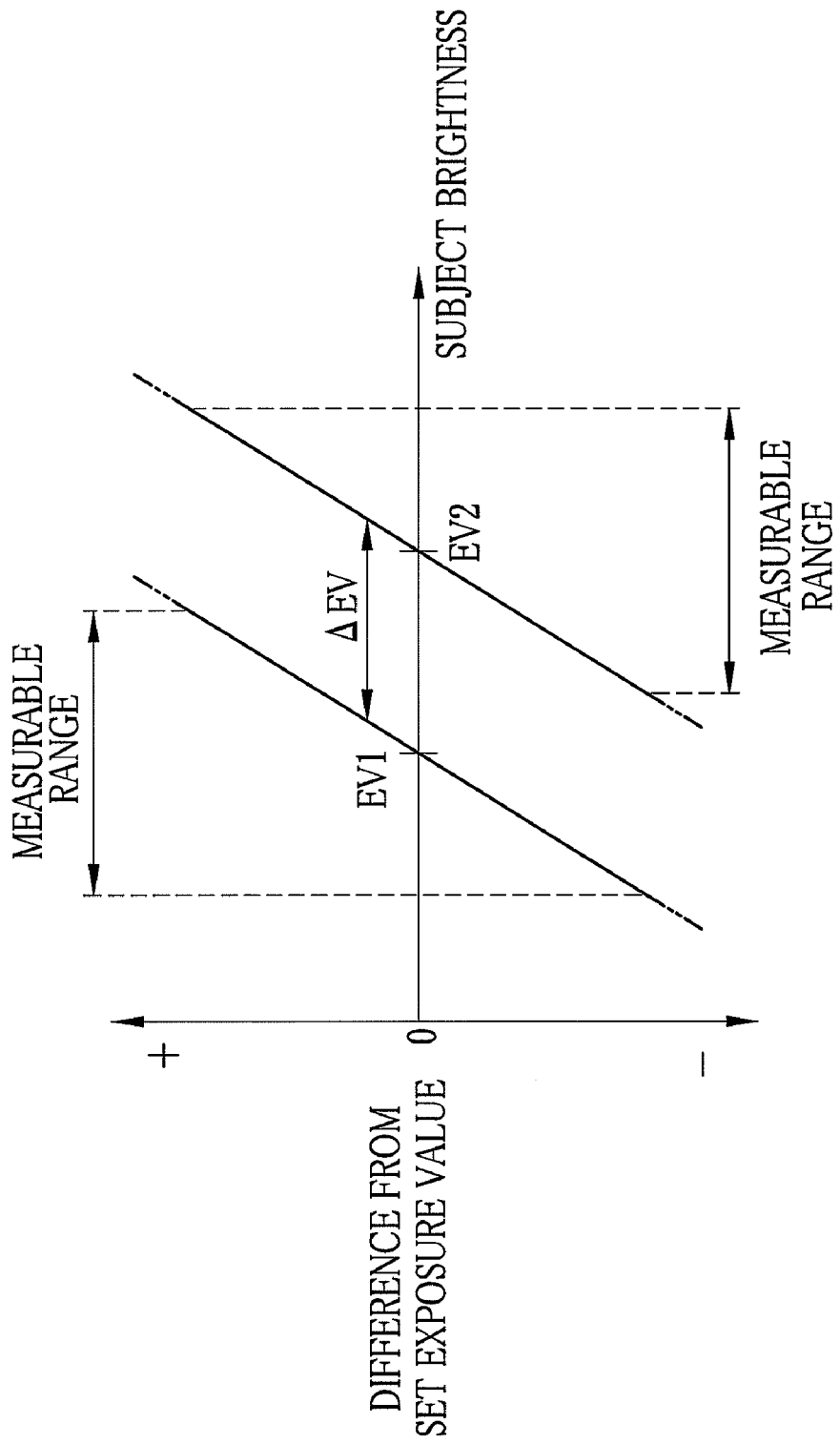
FIG. 3 is a graph illustrating a relation between an exposure value decided by an AE process for still image capturing and an exposure value decided by an AE process for AF.

As shown in FIG. 3, provided that the exposure value (subject brightness value) obtained by the AE process for still image capturing is EV1, the image sensor 13 can actually measure the subject brightness in a constant measurable range around the exposure value EV1, the range being decided by the performance of the image sensor 13 and other factors. In the AE process for AF, considering the expected increase in the subject brightness caused by the AF supplemental light, the image sensor 13 is exposed at an exposure value EV2 that is shifted by a shift amount $\Delta EV$ from the exposure value EV1 to the pulse side. In this way, the measurable range of the subject brightness is shifted to the pulse side during the AE process for AF, to correspond to the illumination with the AF supplemental light.

The shift amount $\Delta EV$ can be calculated as an estimated increment in subject brightness, by any of conventional methods based on the amount of the AF supplemental light and various parameters. For example, the shift amount $\Delta EV$ may be an increment in subject brightness caused by projecting the AF supplemental light of the predetermined intensity toward a subject existing in a shooting distance that can be illuminated effectively with the AF supplemental light. Alternatively, in the above-mentioned case where the face area is determined and served as the AEAF detection area, as it is possible to estimate an approximate subject distance based on the size (area) of the face area, the shift amount $\Delta EV$ may be determined based on the amount of the AF supplemental light and the estimated subject distance. In addition to that, a reflection factor of the face area may be taken into account. Preferably, the shift amount $\Delta EV$ is determined such that the subject brightness EV1 measured on the AE process for still image capturing is included in the measurable range at the exposure value EV2, taking the dynamic range of the image sensor 13 in to consideration.

As will be described in detail later, in a case the AF supplemental light is not projected, the AF process is carried out at the exposure value determined by the AE process for still image capturing. On the other hand, in a case the AF supplemental light is projected, the AF process is carried out at the exposure value determined by the AE process for AF.

The same aperture value as used in the AE process for AF is used in the AF process. Thereby, loss of time is eliminated, which would result from changing the aperture value on proceeding from the AE process for AF to the AF process. Furthermore, the same aperture value as used for capturing a still image, i.e. the aperture value decided by the AE process for capturing the still image, is used in the AF process. Thereby, loss of time is eliminated on proceeding from the AF process to the still image capturing. That is, the same aperture value as used for the still image capturing is used in the AE process for AF.

Concretely, the stop mechanism 16 is driven to set up the aperture value decided by the AE process for capturing the still image, and thereafter the shutter speed is shifted to be a higher level corresponding to the shift amount $\Delta EV$ on executing the AE process for AF. Then the shutter speed is changed according to the exposure value decided by the AE process for AF.

Figure 4:
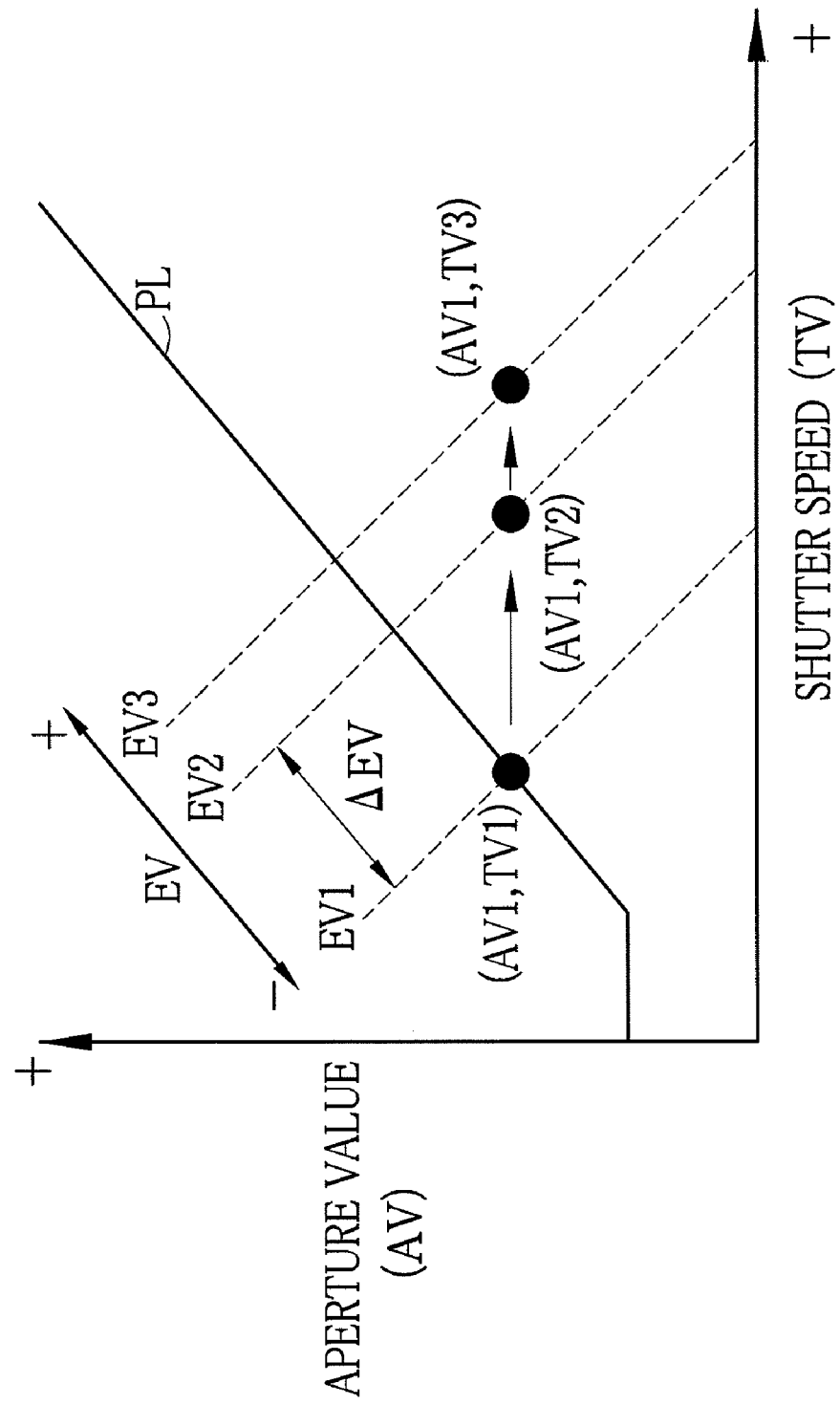
FIG. 4 is a graph illustrating correlation between an aperture value and a shutter speed decided by an AE process for still image capturing, on one hand, and an aperture value and a shutter speed used in an AE process for AF and an AF process.

As shown in FIG. 4, according to a predetermined program line PL, a shutter speed TV1 and an aperture value AV1 are decided corresponding to the exposure value EV1 as decided by the AE process for still image capturing. Then, the AE process for AF is carried out using a shutter speed TV2 that is shifted by the shift amount $\Delta EV$ to the high speed side from the value TV1 (TV2=TV1+$\Delta EV$) while fixing the aperture value at AV1. Provided that EV3 is a proper exposure value to the subject brightness measured by the AE process for AF, the AF process is carried out using the fixed aperture value AV1 and a shutter speed TV3 that provides the exposure value EV3 at the aperture value AV1 (TV3=EV3−AV1).

To speed the AF process, the frame rate of the image sensor 13 on the AF process is changed depending upon the shutter speed decided by the AE process for still image capturing or the AE process for AF. As for the frame rate on the AF process, several choices, e.g. three values, are prepared, so that the system controller 11 may choose the highest available frame rate for driving the image sensor 13 at the decided shutter speed. Then the system controller 11 sets up the timing generator 17 with such parameters that the image sensor 13 is driven at the chosen frame rate. Thus, the frame period is shortened during the AF process, so as to shorten the time necessary for focusing.

In the AF process of the present embodiment, the lens position of the imaging lens 4 is adjusted while the electronic shutter pulse is being applied to the image sensor 13, so the lens position adjustment and the exposure are carried out in the same frame period. Therefore, the time necessary for the lens position adjustment of the imaging lens 4 is taken into consideration at the choice of the frame rate.

In the above embodiment, the exposure value is adjusted by changing the shutter speed without changing the aperture value. In a case where imaging sensitivity is changeable, the exposure value may be adjusted by changing the imaging sensitivity as well as the shutter speed. The exposure value EV3, which is decided by the AE process for AF and is used for the AF process, may be decided as a value at which the in-focus position is well detectable on the AF process.

As described above, the system controller 11 constitutes the second focus control device that carries out the AF process for focusing the imaging lens 4 on the subject located in the AEAF detection area. While the camera-through images are being displayed, the lens position of the focus lens 15a is adjusted in rough steps or at predetermined intervals, so the imaging lens 4 is likely to be out of focus or not exactly focused on the subject at the time when the release button 7 is operated. For this reason, the AF process is executed in response to the operation on the release button 7.

Figure 5:
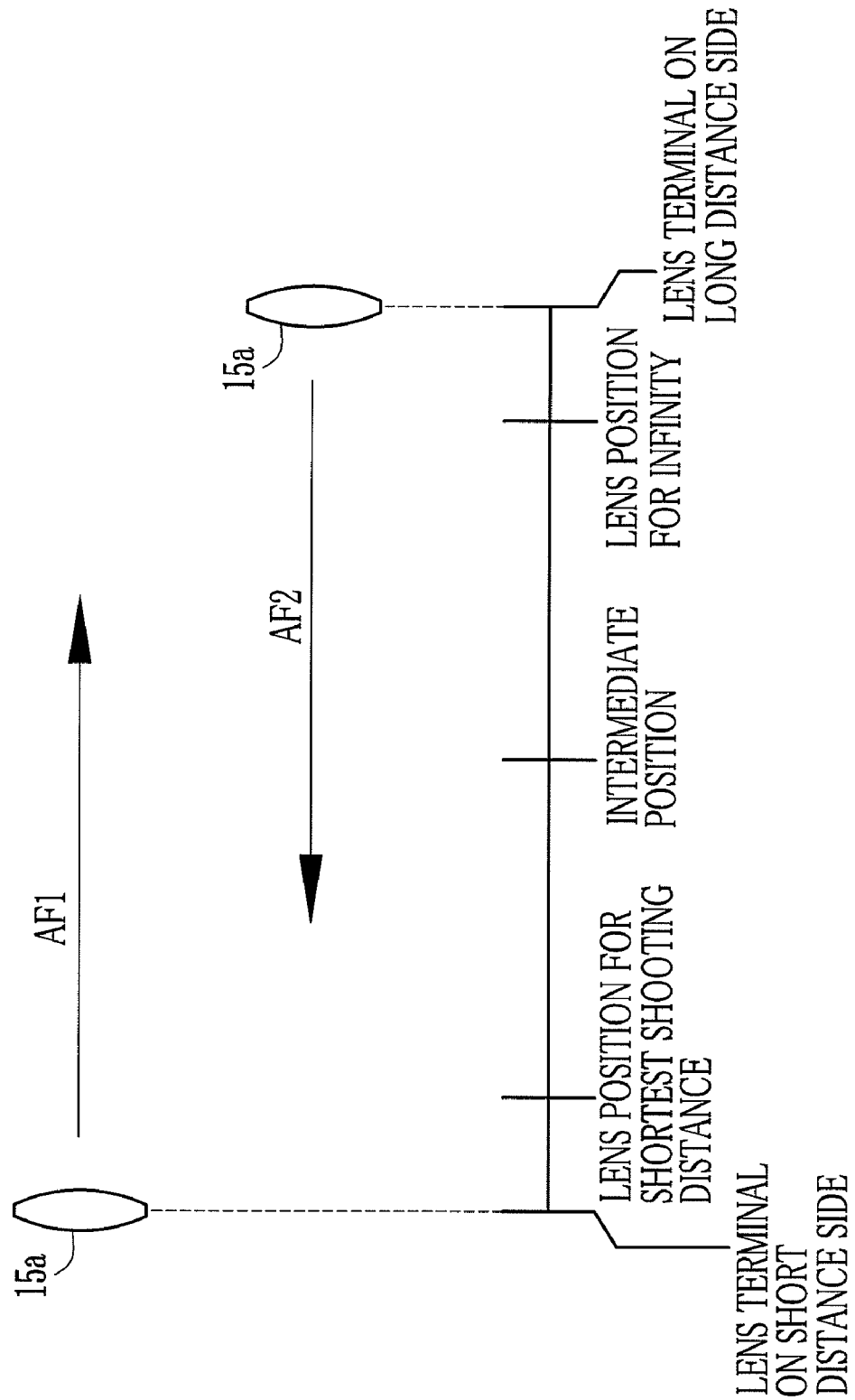
FIG. 5 is an explanatory diagram illustrating a first AF movement of a focus lens from an initial position in one direction, and a second AF movement of the focus lens from another initial position in the opposite direction.
Figure 6:
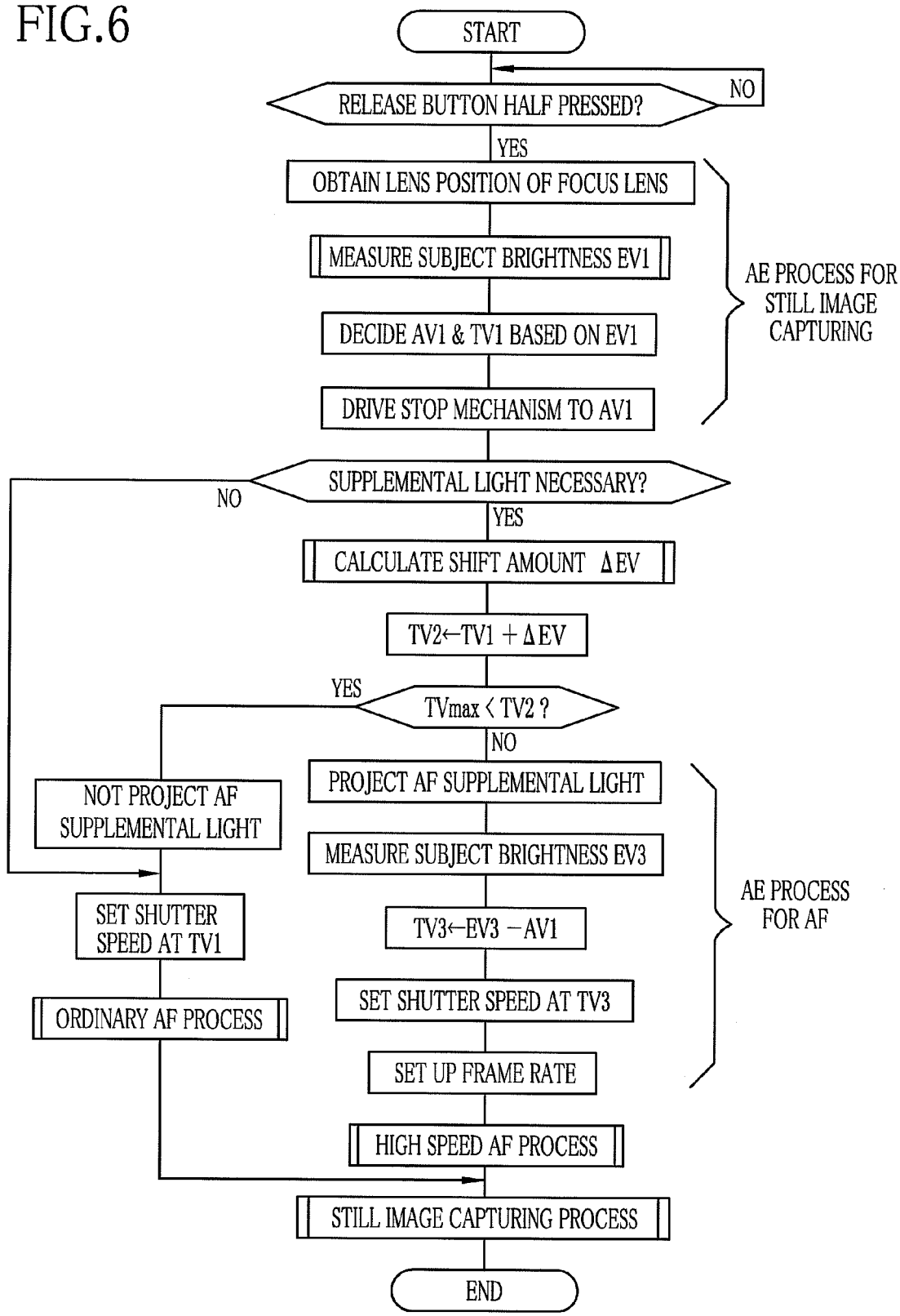
FIG. 6 is a flowchart illustrating a sequence of procedures the digital camera executes in response to an operation on a release button.

In the present embodiment, the AF process is carried out in the above-mentioned contrast peak detection method, and an ordinary AF process is carried out when the AF supplemental light is not projected, whereas a high speed AF process is carried out when the AF supplemental light is projected. However, it is possible to carry out the high speed AF process in either case. Furthermore, in the AF process, the focus lens 15a makes a first AF movement or a second AF movement for detecting the in-focus position of the focus lens 15a, at which the imaging lens 4 is in focus to the aimed subject. As shown in FIG. 5, the first AF movement starts from the lens terminal on the short shooting distance side, and the focus lens 15a is moved step by step toward the opposite lens terminal, as indicated by an arrow AF1. On the contrary, the second AF movement starts from the lens terminal on the long shooting distance side, and the focus lens 15a is moved step by step toward the opposite lens terminal, as indicated by an arrow AF2.

In both of the ordinary and high speed AF processes, an exposure process is made on the image sensor 13 to obtain the AF evaluation value at each step of the focus lens 15a, so as to detect a lens position as the in-focus position, at which the AF evaluation value and thus the image contrast gets the peak. As soon as the AF evaluation value has passed the peak, the focus lens 15a is set at the in-focus position.

In the ordinary AF process, the focus lens 15a makes only the first AF movement to detect the in-focus position. Alternatively, the focus lens 15a may make only the second AF movement to detect the in-focus position in the ordinary AF process. On the other hand, in the high speed AF process, the focus lens 15a makes either the first AF movement or the second AF movement depending upon the lens position of the focus lens 15a at the time when the release button 7 is operated.

Specifically, if the focus lens 15a is at an intermediate position or on the short distance side of the intermediate position, that is, if the focus lens 15a is closer to the lens terminal on the short distance side than the lens terminal on the long distance side, the focus lens 15a makes the first AF movement. In that case, since the subject in the AEAF detection area is assumed to be in the short distance range or near range, the movement of the focus lens 15a to the initial position for starting the AF movement and the movement of the focus lens 15a from the initial position to the in-focus position to the subject become the minimum. Thus, the time necessary for focusing is shortened. On the other hand, if the focus lens 15a is on the long distance side of the intermediate position, that is, if the focus lens 15a is closer to the lens terminal on the long distance side than the lens terminal on the short distance side, the focus lens 15a makes the second AF movement. In that case, since the subject in the AEAF detection area is assumed to be in the long distance range or far range, the movement of the focus lens 15a to the initial position for starting the AF movement and the movement of the focus lens 15a from the initial position to the in-focus position to the subject become the minimum. Thus, the time necessary for focusing is also shortened.

The intermediate position is located at the middle point between the lens position for infinity and the lens position for the shortest shooting distance. Therefore, as being positioned on the long distance side of the intermediate position, the focus lens 15a moves less to the lens position for infinity than to the lens position for the shortest shooting distance. On the contrary, as being positioned on the short distance side of the intermediate position, the focus lens 15a moves less to the lens position for the shortest shooting distance than to the lens position for infinity.

In a case where the focus lens 15a is not moved continuously but moved stepwise to a predetermined lens position after another, the intermediate position is defined to be a lens position, from which the focus lens 15a takes the same number of steps to get either to the position for infinity or to the position for the shortest shooting distance. The intermediate position may also be defined so that the focus lens 15a may get to the in-focus position in the shortest time, while taking both the step number and the actual magnitude of movement of the focus lens 15a (the requisite number of drive pulses) into consideration.

Now, the operation of the digital camera 2 configured as above will be described with reference to FIGS. 6 to 9.

Unless the release button 7 is operated in the imaging mode, the image sensor 13 repeats exposures at constant intervals to display the camera-through images on the LCD 8. While the camera-through images are being displayed, the imaging lens 4 is being focused according to the subject distance in the same way as conventional digital cameras. That is, the lens position of the focus lens 15a is continuously adjusted to focus on the subject.

When the release button 7 is pressed halfway, the lens position of the focus lens 15a at that time is sent from the lens position detector 15b to the system controller 11. Also the AE process for still image capturing starts in response to the half-pressing of the release button 7, to measure the subject brightness value EV1. Assuming that a frame period immediately after the half-pressing of the release button 7 is the first frame period, the system controller 11 sets up the timing generator 17 with those parameters including a shutter speed for first photometry during the first frame period.

In the second frame period, after the stop mechanism 16 is set to an aperture value for the first photometry, the input of the electronic shutter pulse is stopped to make an exposure Ea1 of the image sensor 13. At that time, the image sensor 13 is driven based on the parameters set in the timing generator 17 during the first frame period.

In the third frame period, the charges accumulated in the light receiving elements of the image sensor 13 are transferred or read to output the analog image signals. The image signals are converted through the analog signal processor 18 and the A/D converter 19 into the digital image data, and then sent to the AE detector 25 via the image input controller 20.

While the exposure Ea1 is being made in the second frame period, parameters for the second photometry are set in the timing generator 17. In the third frame period, the stop mechanism 16 is set to an aperture value for the second photometry, making another exposure Ea2 of the image sensor 13. The image signals obtained by the exposure Ea2 are output in the fourth frame period, and the corresponding image data is sent to the AE detector 25.

In the same sequence as above, an exposure Ea3 for the third photometry is made in the fourth frame period, and the consequent image data is sent to the AE detector 25 in the fifth frame period. Also an exposure Ea4 for detecting smear components is made in the fifth frame period. On the exposure Ea4, the image sensor 13 accumulates charges under the same conditions as the exposure Ea3, but the accumulated charges are not moved to a vertical transfer path of the image sensor 13, and those charges existing in the vertical transfer path and a horizontal transfer path are transferred in the sixth frame period. Thereby, such image data that does not contain any components of the subject image but only the smear components is sent to the AE detector 25.

After the image data for the first to third photometry and for detecting the smear components have been obtained, the AE detector 25 calculates on the basis of these photometric image data the subject brightness value EV1 of the AEAF detection area in the seventh frame period. To calculate the subject brightness value EV1 at that time, the image data obtained by the exposure Ea3 is corrected by the image data on the smear components. The subject brightness value EV1 is sent to the system controller 11, and served as the exposure value EV1 for capturing a still image.

The subject brightness value EV1 is converted to a combination of the shutter speed TV1 and the aperture value AV1 on the basis of the predetermined program line, so the stop mechanism 16 is driven to set at the aperture value AV1 in the eighth frame period. Simultaneously, the system controller 11 judges by the subject brightness value EV1 whether to project the AF supplemental light or not.

For example, if the subject brightness value EV1 is below the predetermined level, the system controller 11 judges that the AF supplemental light is necessary. Then the system controller 11 calculates the shift amount ΔEV from the amount of the AF supplemental light and the predetermined parameters, and decides the shutter speed TV2 for the AE process for AF to be a value that is raised by the shift amount ΔEV from the shutter speed TV1 as decided by the AE process for still image capturing.

If the shutter speed TV2 for the AE process for AF gets over a maximum shutter speed TVmax that is the highest available shutter speed of the image sensor 13, the system controller 11 regards that the subject brightness is such a level that can go without the AF supplemental light, and cancels the shift of the shutter speed and makes the same procedures as those without the AF supplemental light. Alternatively, it is possible to drive the stop mechanism 16 to reduce the aperture size so that the shutter speed TV2 may not be more than the maximum shutter speed TVmax. Instead of reducing the aperture size, it is possible to lower the imaging sensitivity.

When the AE process for AF starts in the eighth frame period, the stop mechanism 16 is set to the aperture value AV1, and the timing generator 17 is set up with the parameters including the shutter speed TV2. Also the LED 33 is turned on to project the AF supplemental light.

In the ninth frame period, an exposure Eb1 is made at the aperture value AV1 and the shutter speed TV2, and the result of the exposure Eb1 is output as image signals during the tenth frame period. In the eleventh frame period, the AE detector 25 determines, based on the image data obtained by the exposure Eb1, the subject brightness value EV3 as the proper exposure value EV3 for the AEAF detection area as illuminated with the AF supplemental light.

Figure 9:
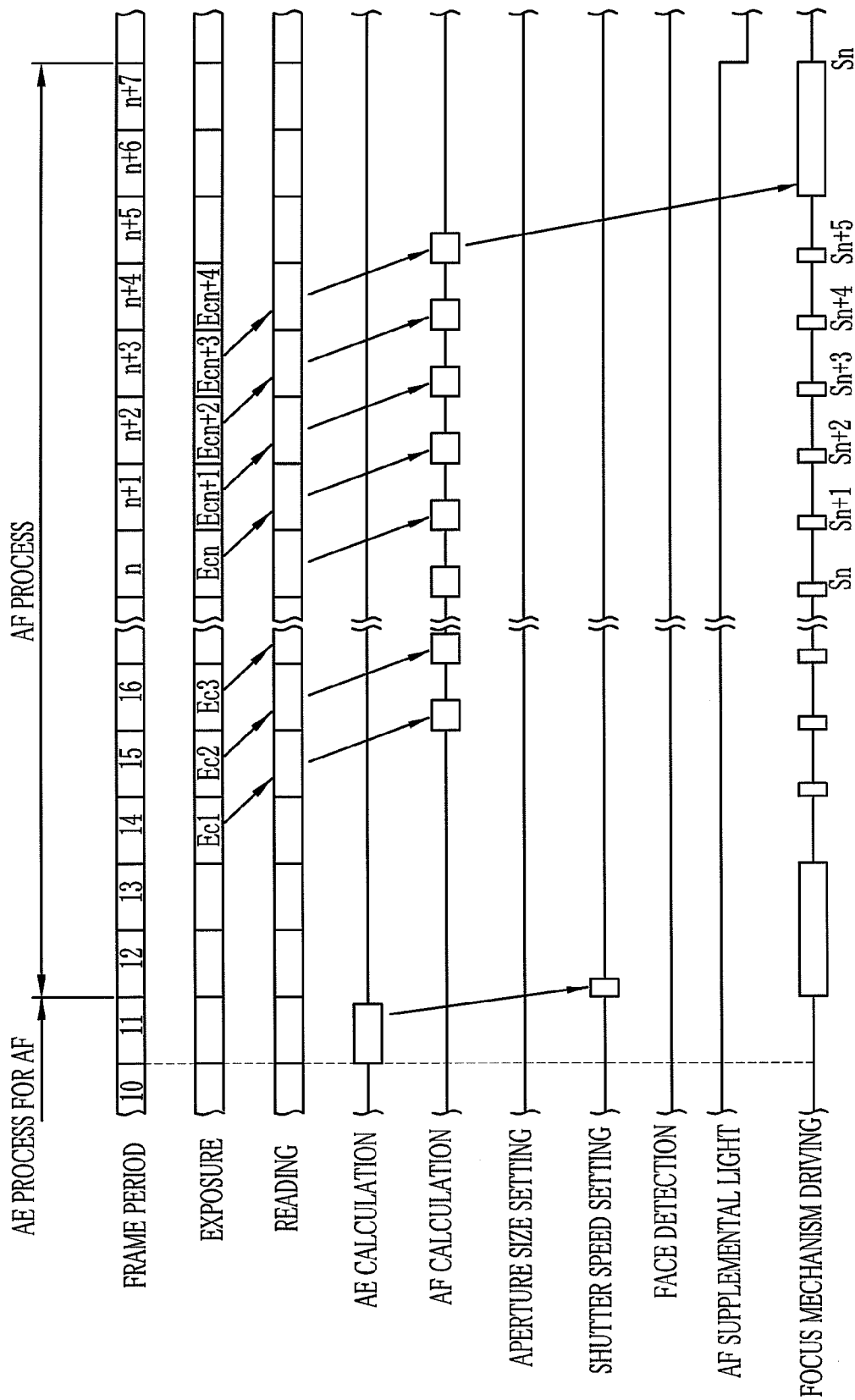
FIG. 9 is a timing chart illustrating operations of the respective components for the AF process under the supplemental light.

Based on the exposure value EV3 and the aperture value AV1, the system controller 11 calculates the shutter speed TV3 for the AF process. When the AF process starts in the twelfth frame period, as shown in FIG. 9, the timing generator 17 is set up with parameters including the shutter speed TV3. At that time, a parameter for the frame rate is set to the highest frame rate available on driving the image sensor 13 at the shutter speed TV3.

Figure 7:
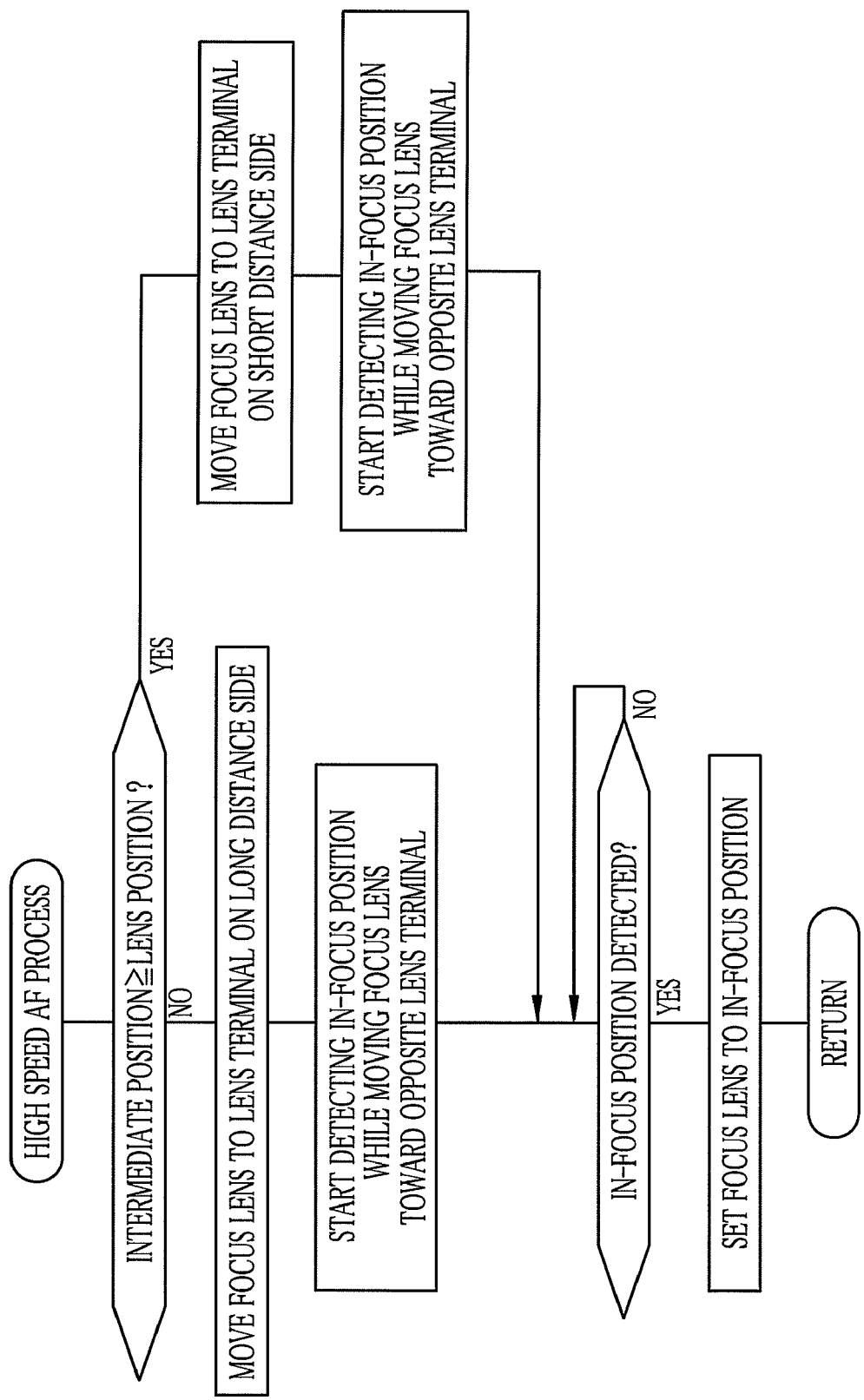
FIG. 7 is a flowchart illustrating a high speed AF process that is executed under a supplemental light.
Figure 8:
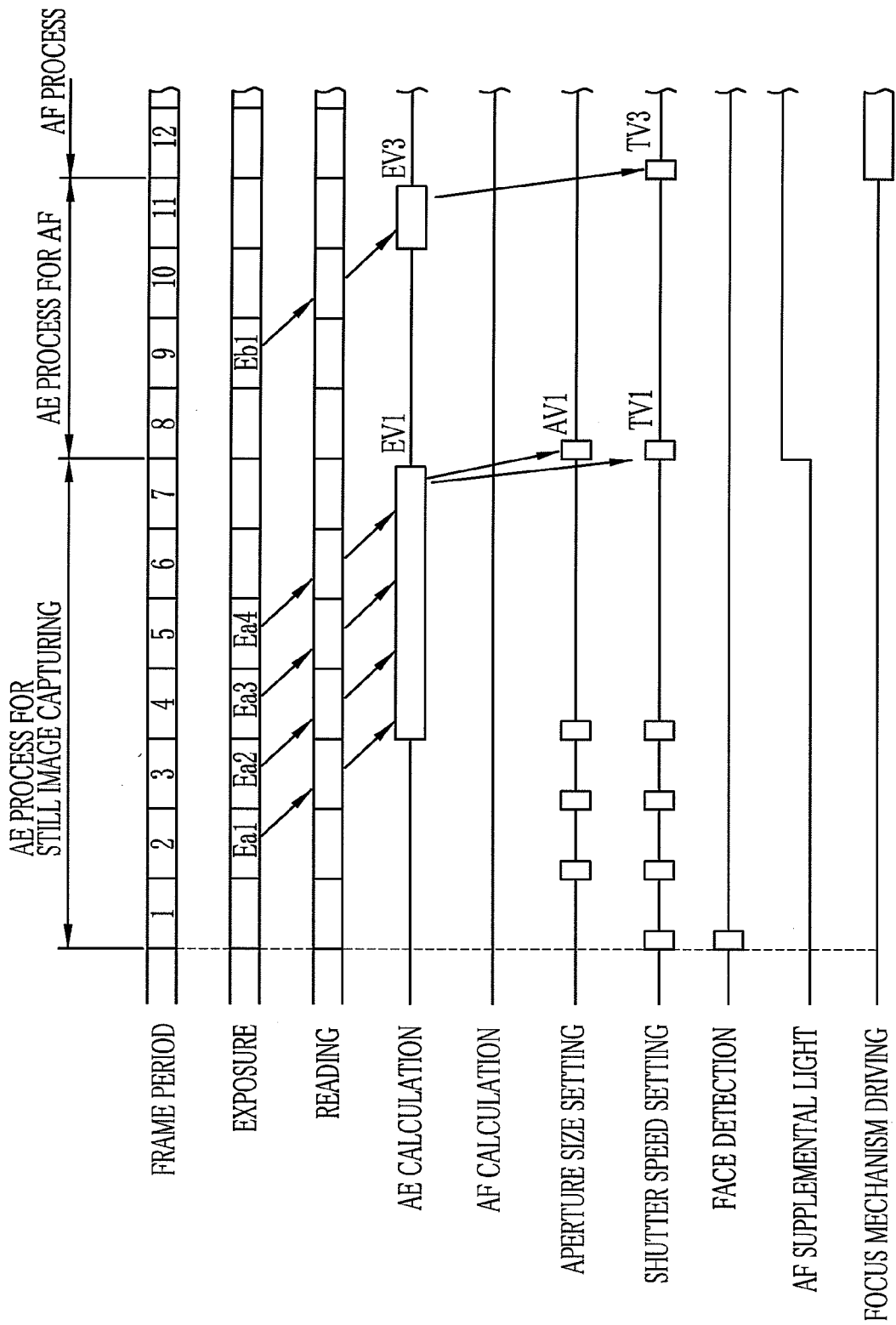
FIG. 8 is a timing chart illustrating operations of respective components of the digital camera for the AE process for still image capturing and the AE process for AF that is executed under the supplemental light.

As the AF supplemental light is being projected, the high speed AF process is executed in the twelfth frame period, as shown in FIG. 7. At the start of the high speed AF process, the system controller 11 compares the lens position of the focus lens 15a, as obtained at the time of half-pressing of the release button 7, with the intermediate position.

For example, if the focus lens 15a is at the intermediate position or on the short distance side of the intermediate position, the first AF movement is chosen. Then, in the twelfth and thirteenth frame periods, the focus lens 15a is moved to the lens terminal on the short distance side as the initial position for starting the first AF movement. Thereafter in the fourteenth frame period, a first exposure Ec1 of the image sensor 13 is made to detect the in-focus position, and the result of the first exposure Ec1 is output as the image signal in the fifteenth frame period. In the sixteenth frame period, the AF detector 24 detects an AF evaluation value of the AEAF detection area based on the exposure Ec1 and outputs it to the system controller 11.

Also in the fifteenth frame period, the focus lens 15a is moved one step from the lens terminal on the short distance side toward the lens terminal on the long distance side. After the one step movement, a second exposure Ec2 for detecting the in-focus position is carried out in the fifteenth frame period. The image signal obtained by the second exposure Ec2 is output in the sixteenth frame period, and an AF evaluation value of the AEAF detection area is sent to the system controller 11 in the seventeenth frame period.

Furthermore, in the sixteenth frame period, the focus lens 15a is moved another step toward the lens terminal on the long distance side and, thereafter, a third exposure Ec3 is carried out. The image signal obtained by the third exposure Ec3 is output in the seventeenth frame period, and an AF evaluation value is sent to the system controller 11 in the eighteenth frame period. In the same way as described so far, the focus lens 15a is moved step by step toward the lens terminal on the long distance side, and an exposure is carried out at each step to obtain an AF evaluation value.

Each time an AF evaluation value is fed to the system controller 11, the system controller 11 checks the input AF evaluation value as to whether it is greater than the already fed AF evaluation values, to detect the in-focus position where the AF evaluation value, i.e. the image contrast, gets the peak. When an AF evaluation value less than the preceding one is newly input, the system controller 11 judges that the focusing lens 15a has gone past the in-focus position. Then the system controller 11 stops the stepwise AF movement of the focus lens 15a, and sets the focus lens 15a to the in-focus position.

In the example shown in FIG. 9, when the system controller 11 receives an AF evaluation value in the (n+5)th frame period, n=an integer, the AF evaluation value being obtained by an exposure Ecn+3 in the (n+3)th frame period, the system controller 11 judges that the image contrast has got the peak at a lens position Sn in the n-th frame period. So the focus lens 15a is moved to the in-focus position Sn in the (n+6)th and (n+7)th frame periods, that are immediately after the (n+5)th frame period.

On the other hand, if the lens position of the focus lens 15a at the time of half-pressing of the release button 7 is on the long distance side of the intermediate position, the system controller 11 chooses the second AF movement at the start of the high speed AF process. Then, in the twelfth and thirteenth frame periods, the focus lens 15a is moved to the lens terminal on the long distance side as the initial position for starting the second AF movement. Thereafter a first exposure Ec1 of the image sensor 13 is carried out for detecting the in-focus position in the fourteenth frame period, and exposures are carried out while the focus lens 15a is moved stepwise toward the lens terminal on the short distance side, to obtain an AF evaluation value from each exposure to detect the in-focus position. Immediately after the in-focus position is detected, the focus lens 15a is moved to the in-focus position.

As described so far, the digital camera 2 chooses the first AF movement or the second AF movement, i.e. the initial position for starting movement and the direction of movement of the focus lens 15a for detecting the in-focus position, depending upon the lens position of the focus lens 15a at the half-pressing of the release button 7. Thereby, both the movement of the focus lens 15a to the initial position and the movement from the initial position to the in-focus position are reduced to the minimum, so the time necessary for focusing is saved.

Even if the subject distance estimated based on the lens position of the focus lens 15a is different from the actual value, the in-focus position can be detected with reference to the AF evaluation values obtained while the focus lens 15a is being moved. Therefore, it is unnecessary to move the focus lens 15a again to the other initial position for starting the AF movement or make any redundant movement of the focus lens 15a, so the time necessary for focusing is not elongated in such cases.

If the exposure value (subject brightness value) EV1 obtained by the AE process for still image capturing is more than the predetermined level, the system controller 11 judges that the AF supplemental light is unnecessary. In that case, the ordinary AF process is executed after the AE process for still image capturing. When the in-focus position is detected by the ordinary AF process, the focus lens 15a is moved immediately to the in-focus position.

In any cases, the AF process is accomplished by setting the focus lens 15a at the detected in-focus position, and the system controller 11 starts the imaging process for capturing a still image after turning off the LED 33. In the imaging process for capturing a still image, the digital camera 2 is first set in a standby state waiting for the release button 7 being fully pressed. When the release button 7 is pressed to the full in the standby state, an exposure for capturing a still image is made at the aperture value AV1 and the shutter speed TV1. Image data obtained by this exposure is subjected to the image processing by the image processor 22 and the data compression by the compander 23, and then written in the memory card 10 by the media controller 26.

Figure 10:
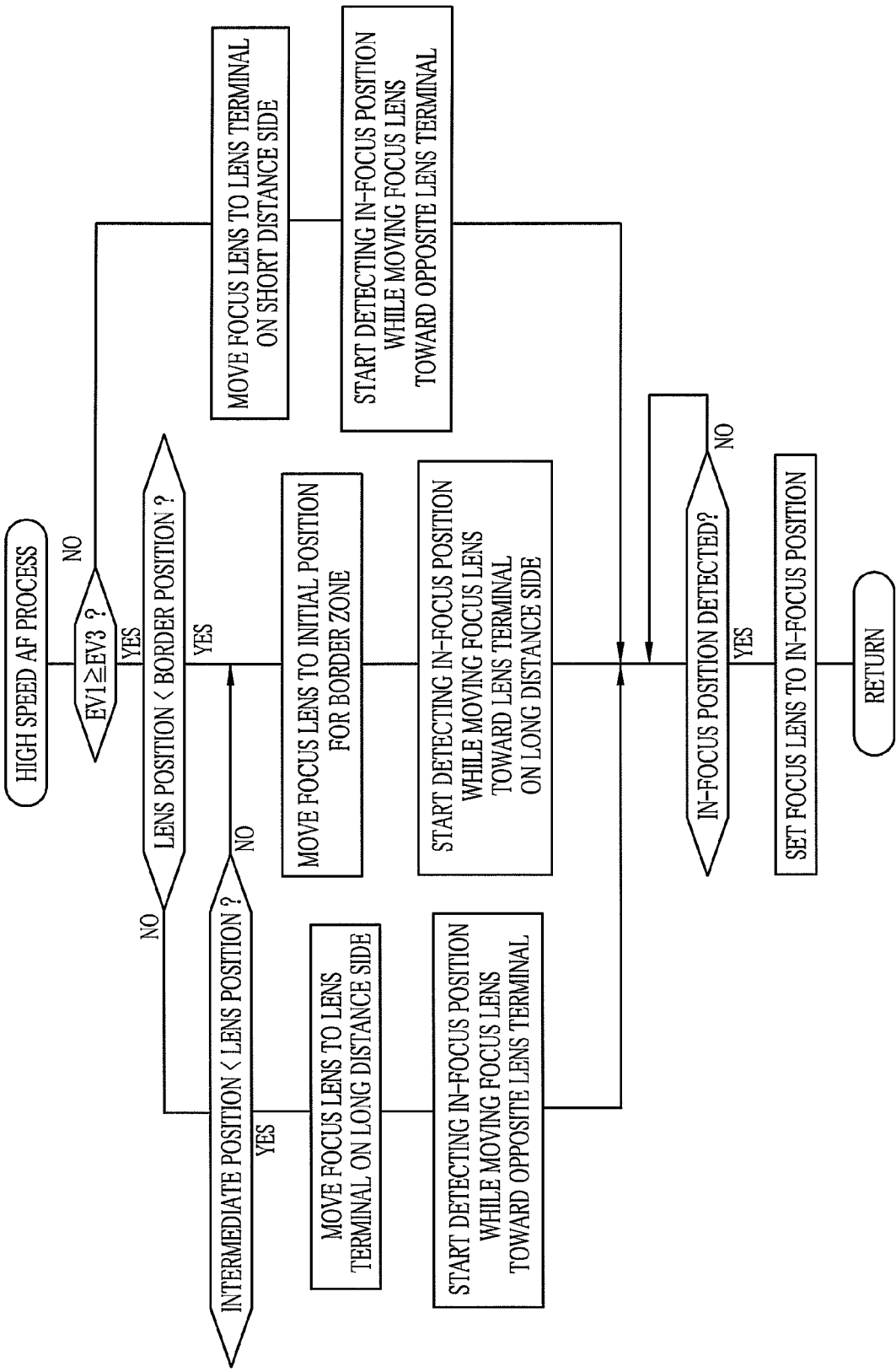
FIG. 10 is a flowchart illustrating a high speed AF process, wherein the AF movement is chosen among three options depending upon a relation between a subject brightness without the AF supplemental light and a subject brightness under the AF supplemental light, and a lens position of the focus lens relative to an intermediate position and a border position that corresponds to a shooting distance beyond which the AF supplemental light does not effectively reach.

FIG. 10 shows another embodiment wherein the AF movement (the initial position and the direction of the AF movement) in the high speed AF process is chosen depending upon the lens position of the focus lens and whether the subject brightness under the AF supplemental light is more than the subject brightness without the AF supplemental light. The following description will relate only to essential features to the second embodiment, and other features of the second embodiment are fundamentally the same as the above embodiment.

The system controller 11 regards the subject brightness EV1 measured by the AE process for still image capturing as the subject brightness without the AF supplemental light, and regards the subject brightness EV3 measured by the AE process for AF as the subject brightness under the AF supplemental light. Thus, the system controller 11 compares EV1 with EV3. If the subject brightness EV3 under the AF supplemental light is more than the subject brightness EV1 without the AF supplemental light (EV1<EV3), the subject in the AEAF detection area exists in such a near distance range where the subject brightness is raised by the AF supplemental light. In that case, the in-focus position is expected to be found sooner by moving the focus lens 15a from the lens terminal on the short distance side toward the long distance side than from the lens terminal on the long distance side toward the short distance side. For this reason, the system controller 11 chooses the first AF movement.

Figure 11:
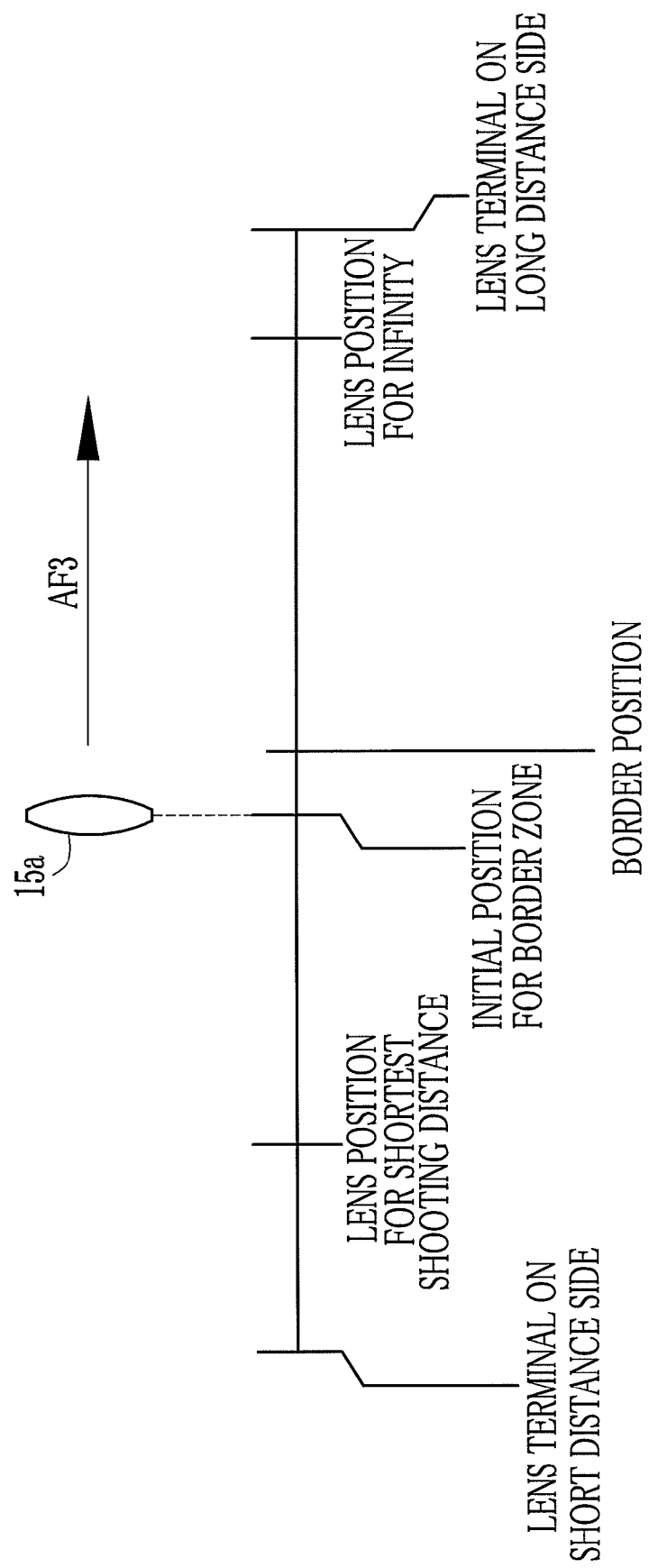
FIG. 11 is an explanatory diagram illustrating a third AF movement that starts from an initial position corresponding to the border position.

On the contrary, if the subject brightness EV3 is equal to or less than the subject brightness EV1 (EV1≧EV3), the lens position of the focus lens 15a is compared with a border position, as shown in FIG. 11. The border position is a lens position of the focus lens 15a at which the imaging lens 4 is in focus to a border shooting distance that is a nearest end of an unreachable range for the AF supplemental light. In the light unreachable range, the subject brightness will not practically increase even if the AF supplemental light is projected from the digital camera 2. Note that the border position varies with the change in f-number due to zooming of the imaging lens 4 or with the change in aperture value of the stop mechanism 16, so the border position can be on the short distance side or the long distance side of the intermediate position.

When the lens position of the focus lens 15a is on the long distance side of the border position, the lens position of the focus lens 15a is further compared with the intermediate position. If the lens position of the focus lens 15a is on the long distance side of the intermediate position, the system controller 11 judges that the focus lens 15a is closer to the lens position for infinity or the lens terminal on the long distance side, and chooses the second AF movement.

If, at that time, the lens position of the focus lens 15a is equal to or on the short distance side of the intermediate position, the subject is estimated to be in an intermediate shooting range. Then the system controller 11 chooses a third AF movement for the focus lens 15a. Also when the subject brightness EV3 is not more than the subject brightness EV1 while the focus lens 15a is on the short distance side of the border position, the third AF movement is chosen.

In the third AF movement, as indicated by an arrow AF3 in FIG. 11, the focus lens 15a starts the AF movement from an initial position for border zone, which is defined corresponding to the above-mentioned border position, toward the lens terminal on the long distance side. The initial position for border zone is several steps shifted from the border position toward the short distance side, so that the in-focus position may be detected by the step-by-step contrast peak detection method even while the in-focus position coincides with the intermediate lens position. Therefore, if the method of detecting the in-focus position allows, the initial position for border zone can be equal to the border position.

As described so far, the AF movement is chosen depending upon the relation between the subject brightness EV1 and the subject brightness EV3 and the lens position of the focus lens 15a, and the third AF movement is chosen when the subject is judged to be at an intermediate shooting distance. Thereby, the in-focus position is detected faster.

In the above embodiment, the intermediate position is located at the middle point between the lens position for infinity and the lens position for the shortest shooting distance, the intermediate position may alternatively be a middle position between the border position and the lens position for infinity or the lens terminal on the long distance side, or may be another appropriate position.

Figure 12:
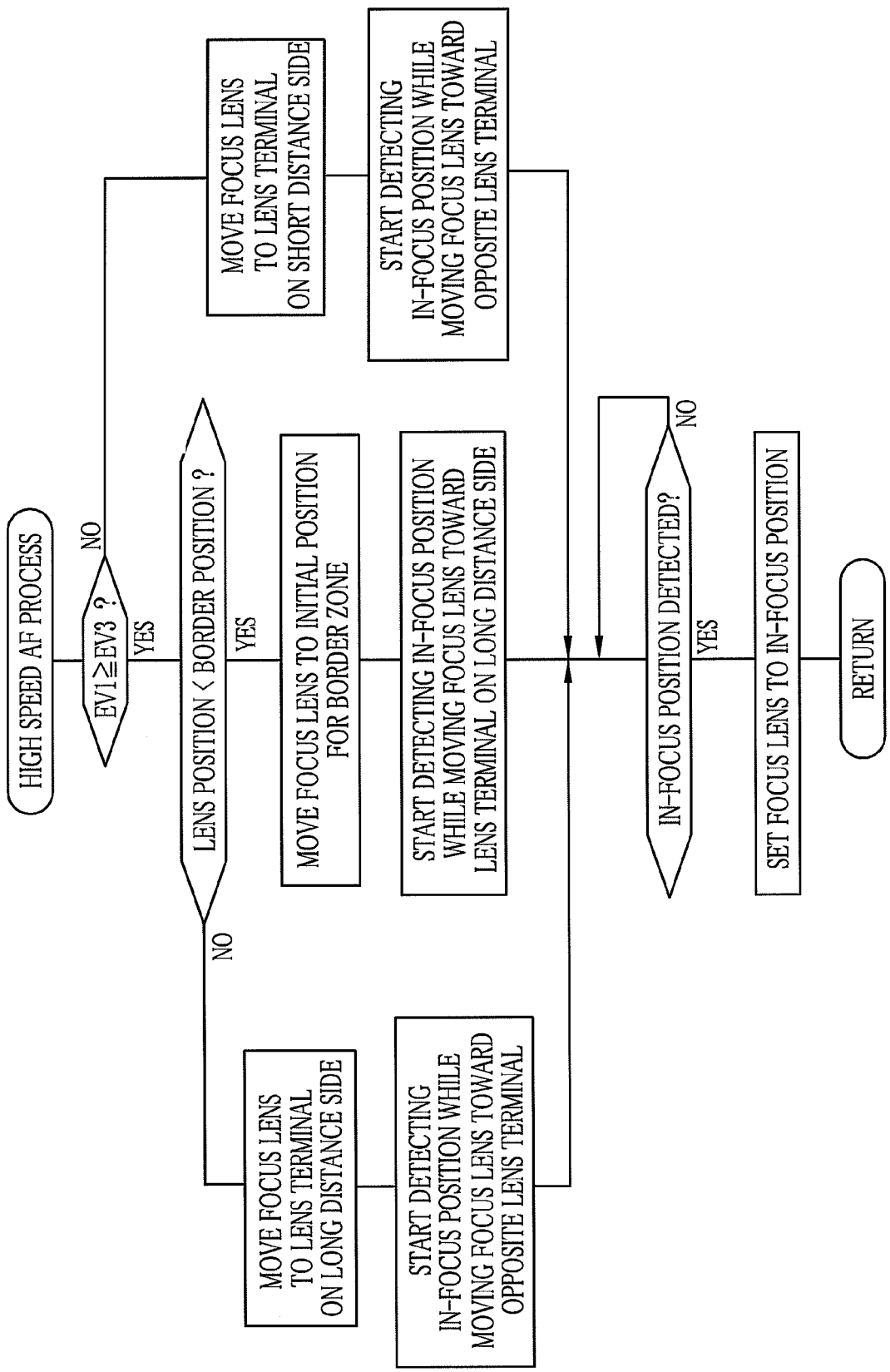
FIG. 12 is a flowchart illustrating a high speed AF process, wherein the AF movement is chosen depending upon the relation between the subject brightness without the AF supplemental light and the subject brightness under the AF supplemental light, and the lens position of the focus lens relative to the border position.

It is possible to define the border position as a fixed position on the long distance side of the intermediate position. In that case, the high speed AF process may be executed in a procedure as shown in FIG. 12. In this case, the lens position of the focus lens 15a is compared with the border position if the subject brightness EV3 measured under the AF supplemental light is equal to or less than the subject brightness EV1 measured without the AF supplemental light (EV1≧EV3). If the lens position of the focus lens 15a is on the short distance side of the border position at that time, the third AF movement is chosen. If the lens position of the focus lens 15a is equal to or on the long distance side of the border position, the second AF movement is chosen. If the subject brightness EV3 is or more than the subject brightness EV1 (EV1<E3), the first AF movement is chosen.

In the above embodiment shown in FIGS. 10 and 12, even when the AF supplemental light is unnecessary, it is possible to get the subject brightness values EV1 and EV3 from the AEAF detection area with and without the AF supplemental light, and detect the in-focus position in the same way as described above.

According to the embodiment shown in FIGS. 10 and 12, even where the lens position of the focus lens 15a is on the short distance side of the border position, if the subject brightness is not raised by the AF supplemental light (EV1≧EV3), the third AF movement is chosen. This is because, when the subject brightness is so low that the AF supplemental light is needed, the shooting distance can be more reliably detected based on the change in subject brightness brought by the AF supplemental light than the change in image contrast brought by the movement of the focus lens 15a. For this reason, the speed and the accuracy of focusing are increased by checking at first how the subject brightness is changed by the AF supplemental light.

Figure 13:
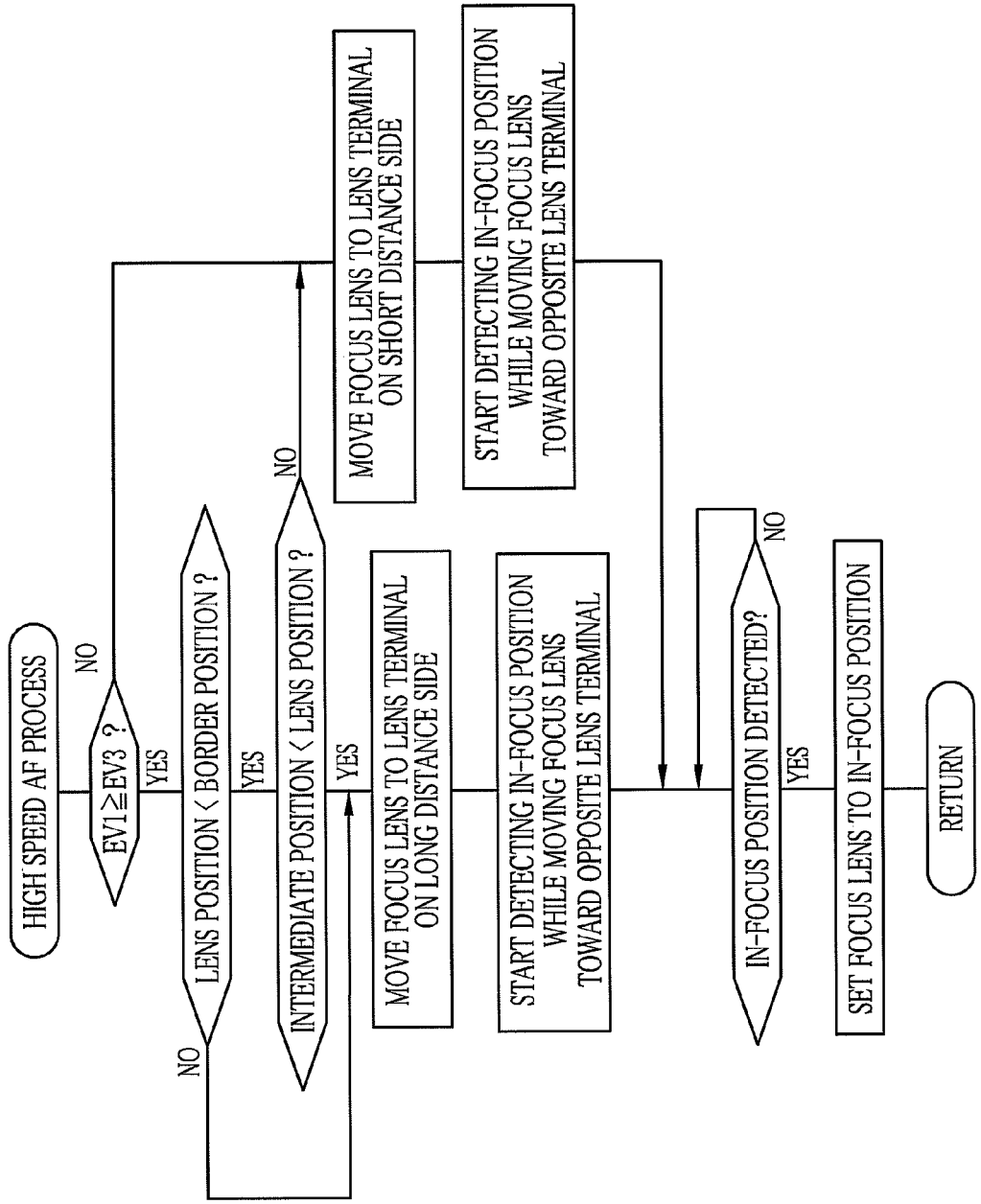
FIG. 13 is a flowchart illustrating a high speed AF process, wherein the first or the second AF movement is chosen depending upon the relation between the subject brightness without the AF supplemental light and the subject brightness under the AF supplemental light, and the lens position of the focus lens relative to the intermediate position and the border position.

However, the high speed AF process can be done while giving priority to the lens position of the focus lens 15a over the change in subject brightness brought by the AF supplemental light. In an example shown in FIG. 13, if the subject brightness is raised by the AF supplemental light, the first AF movement is chosen, like in the embodiments of FIGS. 10 and 12. If the subject brightness is not raised by the AF supplemental light and the focus lens 15a is on the long distance side of the border position, the second AF movement is chosen. If the subject brightness is not raised by the AF supplemental light and the focus lens 15a is on the short distance side of the border position, the lens position of the focus lens 15a is compared with the intermediate position. Then, the first AF movement is chosen if the lens position of the focus lens 15a is on the short distance side of the intermediate position, whereas the second AF movement is chosen if the lens position of the focus lens 15a is on the long distance side of the intermediate position.

Namely, if the subject brightness does not increase and the focus lens 15a is on the short distance side of the border position, the subject can exist in a relatively near range according to the estimation based on the lens position of the focus lens 15a, but the subject can also exit in a far range according to the estimation based on the change in subject brightness. In that case, the lens position of the focus lens 15a is compared with the intermediate position, to choose the first AF movement or the second AF movement depending upon the lens position relative to the intermediate position. Thereby, even where the in-focus position is at the middle point between the lens position for the shortest shooting distance and that for infinity, the in-focus can be detected by making the AF movement just in one direction, while the movement of the focus lens 15a to the initial position for starting the AF movement is minimized.

Figure 14:
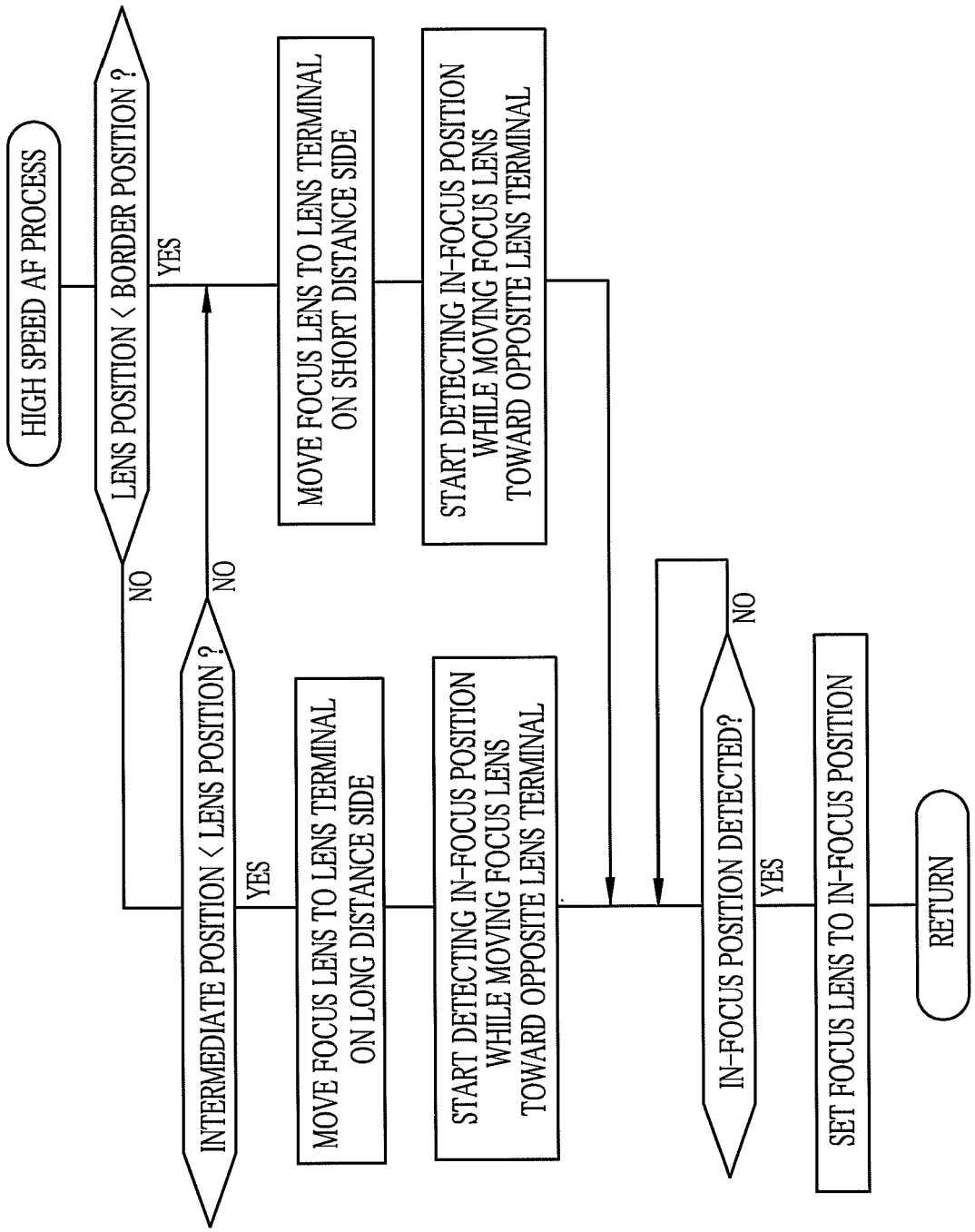
FIG. 14 is a flowchart illustrating a high speed AF process, wherein the first or the second AF movement is chosen depending upon the lens position of the focus lens relative to the intermediate position and the border position.

FIG. 14 shows another embodiment of the high speed AF process, wherein the initial position and the direction of the AF movement are chosen with reference to the intermediate position and the border position. In this embodiment, if the focus lens 15a is on the short distance side of the border position, the first AF movement is chosen. Also if the focus lens 15a is on the long distance side of the border position but not on the long distance side of the intermediate position, the first AF movement is chosen. If the focus lens 15a is on the long distance side of the intermediate position, the second AF movement is chosen.

Accordingly, in the embodiment of FIG. 14, if the border position is on the long distance side of the intermediate position, the AF movement is chosen depending upon whether the focus lens 15a is on the long distance side or on the short distance side of the border position. On the contrary, if the border position is on the short distance side of the intermediate position, the AF movement is chosen depending upon whether the focus lens 15a is on the long distance side or on the short distance side of the intermediate position.

Figure 15:
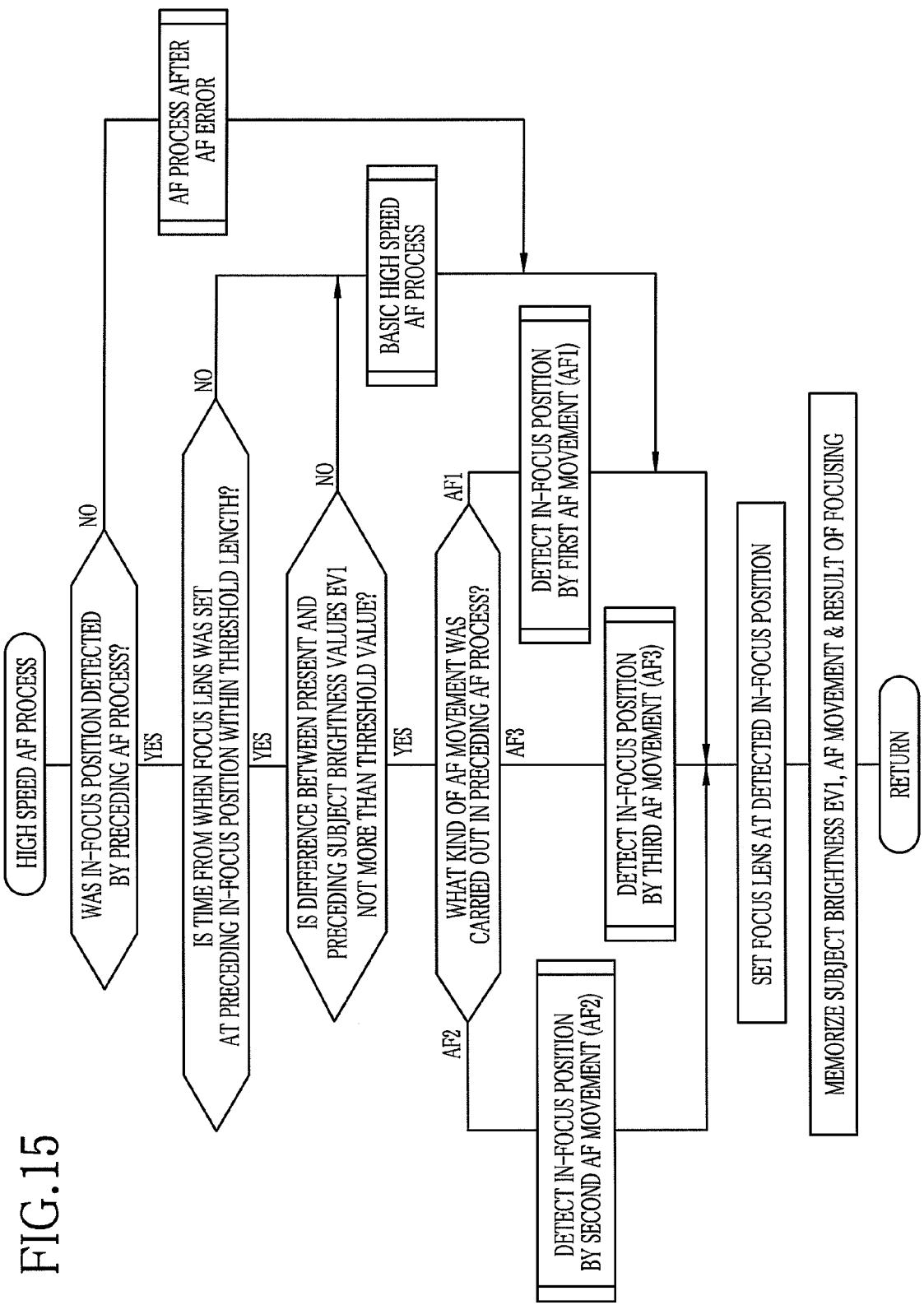
FIG. 15 is a flowchart illustrating a high speed AF process, wherein the same AF movement as preceding is chosen if a present composition is held to approximate a preceding composition during the preceding AF process.

FIG. 15 shows a further embodiment, wherein it is judged whether the composition at the half-pressing operation on the release button 7 approximates to that at the preceding operation on the release button 7, and if the answer is yes, the in-focus position is detected by the same AF movement as chosen at the preceding AF process. For example, in this embodiment, the system controller 11 writes the AF movement chosen in the preceding high speed AF process, the result as to whether the in-focus position was detected by the preceding AF movement, and the subject brightness EV1 measured in response to the preceding half-press of the release button 7 in the RAM 11b, at the completion of the preceding high speed AF process.

When the system controller 11 executes the high speed AF process in response to the next half-pressing operation on the release button 7, the system controller 11 first accesses the RAM 11b to check the result of the high speed AF process responding to the preceding half-press of the release button 7, as to whether the in-focus position was detected or not. If the in-focus position was detected by the preceding high speed AF process, the system controller 11 judges whether the length of time from when the focus lens 15a was set at the in-focus position in the preceding high speed AF process to when the release button 7 was pressed halfway for the present high speed AF process is within a predetermined threshold value, as well as whether a difference between a subject brightness value EV1 measured by the present AE process for still image capturing and a subject brightness value EV1 measured by the preceding AE process for still image capturing is not more than a predetermined threshold value. In this way, the system controller 11 determines how much the present composition differs from the preceding one.

If the above-mentioned lapse of time is within the predetermined length, and the difference in subject brightness EV1 is not more than the predetermined value, the system controller 11 judges that the present composition approximates the preceding one. Then, the system controller 11 accesses the RAM 11b to check what kind of AF movement was chosen in the preceding high speed AF process, and detects the in-focus position by the same AF movement as in the preceding high speed AF process. Note that the threshold time length and the threshold difference in subject brightness EV1 for checking the shift degree of the present composition from the preceding one should be experimentally and statistically predetermined to be such small values that it can be held that there is substantially no difference between them with in these threshold values. The start point for counting the length of time can be the time when the release button 7 was pressed halfway for the preceding preparatory processes, not but the time when the focus lens 15a was set at the preceding in-focus position.

If the length of time since the preceding AF process is over the predetermined value, or if the difference in subject brightness EV1 is more than the predetermined value, the system controller 11 judges that the present composition is pretty different from the preceding one, and executes a basic high speed AF process. The basic high speed AF process may be carried out in the same procedure as described with reference to FIG. 7, 10, 12, 13 or 14, or using another AF movement chosen based on other parameters.

Figure 16:
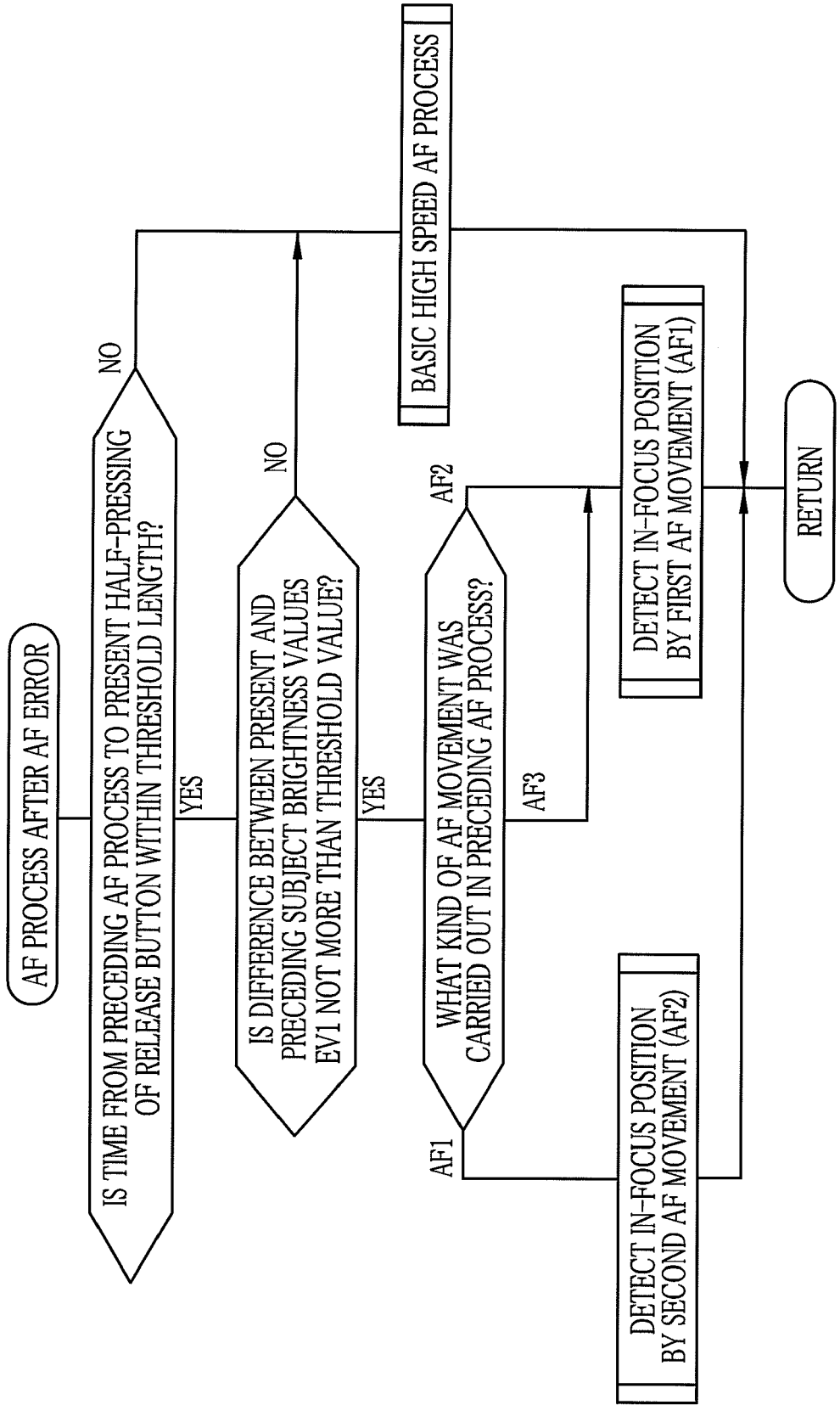
FIG. 16 is a flowchart illustrating an AF process after AF error, which is executed when the in-focus position was not detected in the preceding AF process.

If the in-focus position was not detected by the preceding AF movement, the system controller 11 executes a special AF process after AF error as shown in FIG. 16. In the AF process after AF error, the system controller 11 judges whether the length of time passed from the preceding AF process till the release button 7 was pressed halfway for the present preparatory processes is within a predetermined threshold value, as well as whether difference between the subject brightness value EV1 measured by the present AE process and the subject brightness value EV1 measured by the preceding AE process is not more than a predetermined threshold value. Thereby, the system controller 11 determines how much the present composition shifts from the preceding one.

If the length of the passed time is within the predetermined value, and the difference in subject brightness EV1 is not more than the predetermined value, the system controller 11 checks what kind of AF movement was chosen in the preceding AF process, to choose another kind of AF movement. According to the present embodiment, if the first AF movement was chosen in the preceding AF process, the system controller 11 chooses the second AF movement for the present AF process. If, on the other hand, the second AF movement was chosen in the preceding AF process, the system controller 11 chooses the first AF movement for the present AF process. If the third AF movement was chosen in the preceding AF process, the system controller 11 chooses the first AF movement for the present AF process. To choose the different AF movement from the preceding one is to increase the probability of detecting the in-focus position.

In the AF process after AF error, if the above-mentioned lapse of time is over the predetermined value, or if the difference in subject brightness EV1 is more than the predetermined value, the system controller 11 judges that the present composition is pretty different from the preceding one, and executes the basic high speed AF process. Instead of the above-described AF process after AF error, it is of course possible to execute the basic high speed AF process when the in-focus position was not detected by the preceding AF movement.

Figure 17:
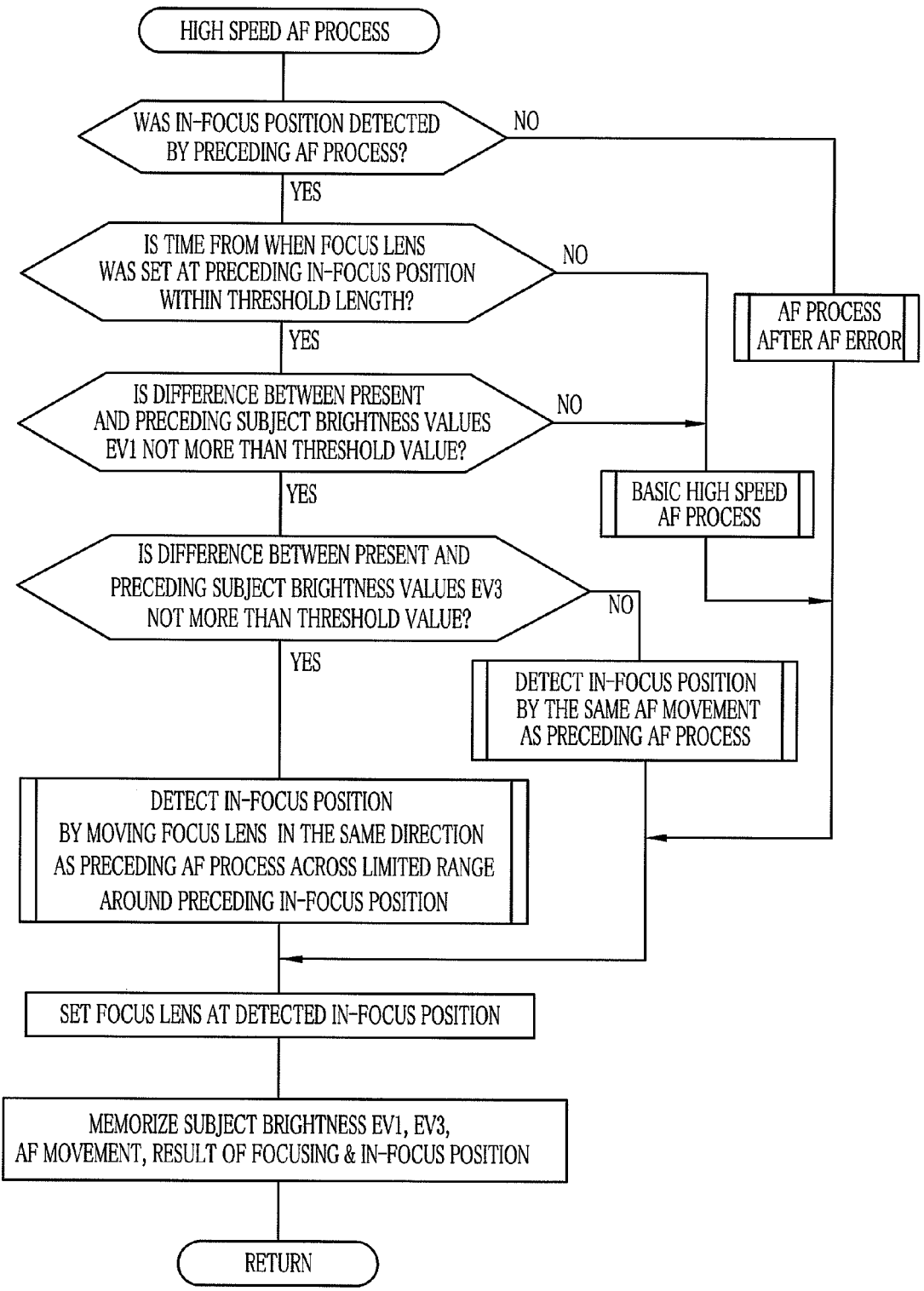
FIG. 17 is a flowchart illustrating a high speed AF process, wherein an AF movement is carried out in a limited focusing range around the preceding in-focus position if the present composition is held to approximate the preceding composition.
Figure 18:
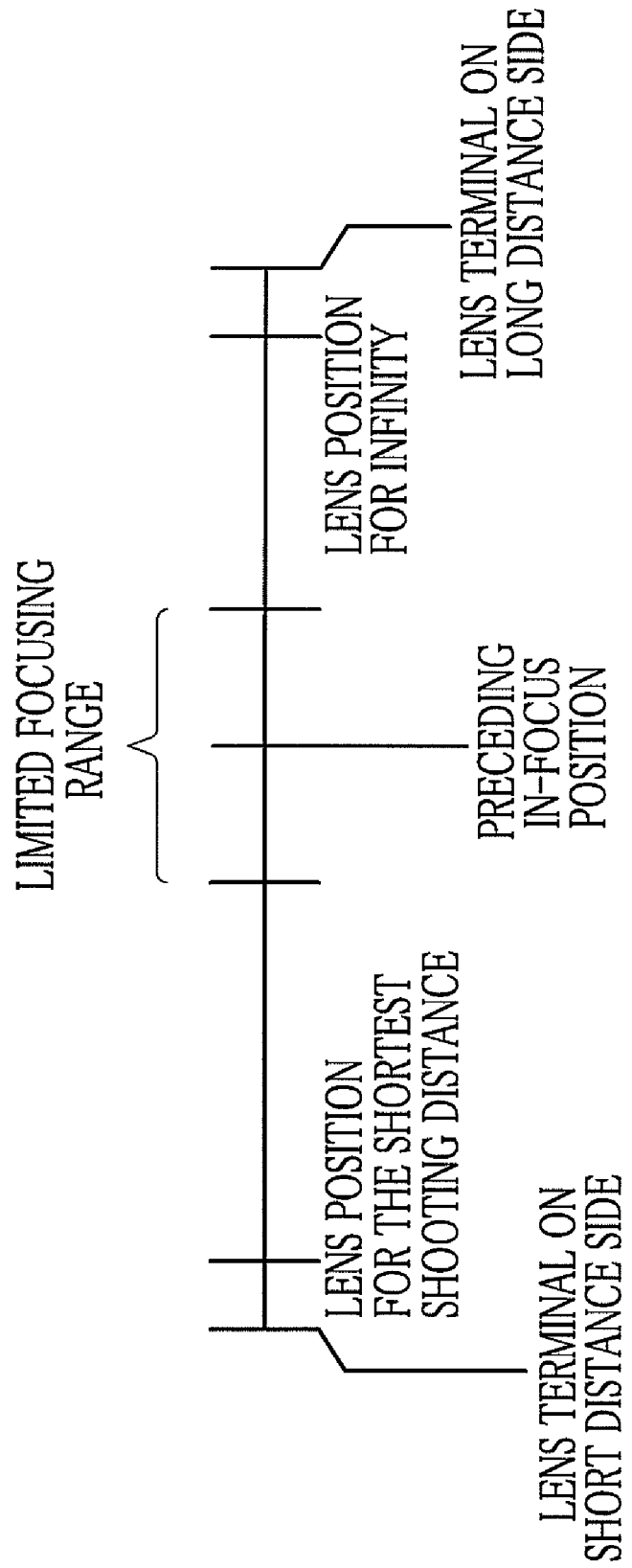
FIG. 18 is an explanatory diagram illustrating the limited focusing range around the preceding in-focus position.

FIG. 17 shows an embodiment, wherein the preceding in-focus position is memorized, and if it is judged the composition approximates the preceding one, the AF movement for detecting the in-focus position is carried out in a limited range around the preceding in-focus position. This way, the in-focus position can be detected in a shorter time. In the embodiment, if the above-mentioned lapse of time is within the predetermined value and the difference between the preceding subject brightness EV1 and the present subject brightness EV1 is not more than the predetermined value, the present subject brightness EV3 is compared with the preceding subject brightness EV3.

If the difference between the preceding subject brightness EV3 and the present subject brightness EV3 is not more than a predetermined value, i.e. the difference is little, the system controller 11 judges that the present composition is little different from the preceding one, and reads out data of the preceding in-focus position and the preceding AF movement from the RAM 11b. Then, in order to detect the in-focus position, the AF movement is carried out in a limited focusing range around the preceding in-focus position, e.g. several steps before and behind the preceding in-focus position.

Furthermore, the AF movement in the limited focusing range is carried out in the same direction as the preceding AF movement. Therefore, if the first or third AF movement was carried out in the preceding AF process, the focus lens 15a is moved from the short distance side toward the long distance side in the limited focusing range. If the second AF movement was carried out in the preceding AF process, the focus lens 15a is moved from the long distance side toward the short distance side in the limited focusing range.

In this way, if it is presumed by the comparison of the present subject brightness EV3 with the preceding one that the present composition does not substantially differ from the preceding one, the AF movement is carried out only within the limited focusing range around the preceding in-focus position, speeding the detection of the in-focus position. Note that if the difference in subject brightness EV3 is more than the predetermined value, the system controller 11 reads out the data of the preceding AF movement from the RAM 11b, to make the same AF movement as the preceding one.

In the just described embodiment, the degree of difference between the present composition and the preceding one is judged not only by the difference in subject brightness EV1 but also the difference in subject brightness EV3. However, it is possible to omit the comparison of the present subject brightness value EV3 with the preceding subject brightness value EV3. In that case, the length of time passed from the preceding half-pressing to the present half-pressing of the release button 7 and the difference in subject brightness EV1 should be compared with stricter tolerance values respectively. When it is judged by the comparisons with the stricter values that the represent composition scarcely differs from the preceding one, the AF movement for detecting the in-focus position is carried out only in the limited focusing range.

Figure 19:
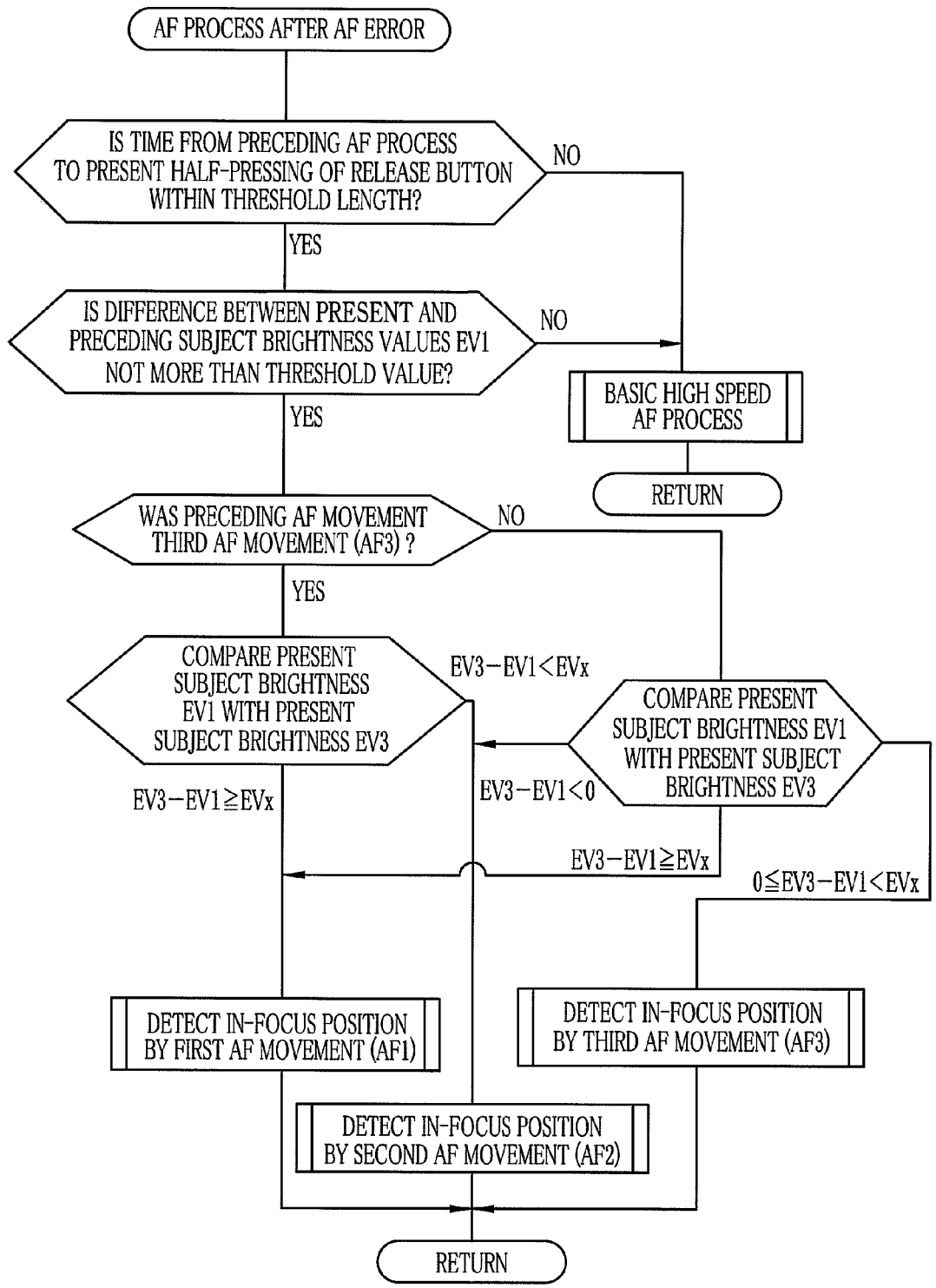
FIG. 19 is a flowchart illustrating a variation of the AF process after AF error.

FIG. 19 shows a variation of the AF process after AF error that is carried out when the in-focus position was not detected by the preceding AF movement. Like the AF process after AF error as shown in FIG. 16, it is first checked whether the length of time passed from the preceding AF process is not over a predetermined value, and also whether the difference between the present subject brightness EV1 and the preceding one is not more than a predetermined value. If the length of passed time is over the predetermined value, or if the difference in subject brightness EV1 is more than the predetermined value, the system controller 11 judges that the present composition is pretty different from the preceding one, and executes a basic high speed AF process.

If the length of passed time is not over the predetermined value, and the difference in subject brightness EV1 is not more than the predetermined value, the system controller 11 checks if the preceding AF movement was the third AF movement. If the answer is yes, the system controller 11 compares the subject brightness values EV1 and EV3 as measured in response to the latest half-pressing of the release button 7. If the subject brightness value EV3 is larger than the subject brightness value EV1 by more than a predetermined threshold value EVx(EV3−EV1≧EVx), the system controller 11 executes the first AF movement. Otherwise, i.e. if EV3−EV1<EVx, the system controller 11 executes the second AF movement. If the preceding AF movement was not the third AF movement, the system controller 11 compares the subject brightness values EV1 and EV3 as measured in response to the latest half-pressing of the release button 7, and executes the AF movement in the same way as the case where the preceding AF movement was the third AF movement. But in that case, if the subject brightness EV3 is less than the subject brightness EV1, i.e. EV3−EV1<0, the second AF movement is chosen.

By making the AF movement in the way as described above, if the in-focus position was not detected by the third AF movement in the preceding AF process, the third AF movement is not chosen in the present AF process even in a case where the third AF movement would be usually chosen as the result of the comparison between the present subject brightness EV1 and subject brightness EV3. Instead, the second AF movement is chosen in that case, and the whole range, i.e. the range from the lens position for the shortest shooting distance to the lens position for infinity, is chosen as the focusing range for detecting the in-focus position. Thereby, the probability of detecting the in-focus position is increased.

Figure 20:
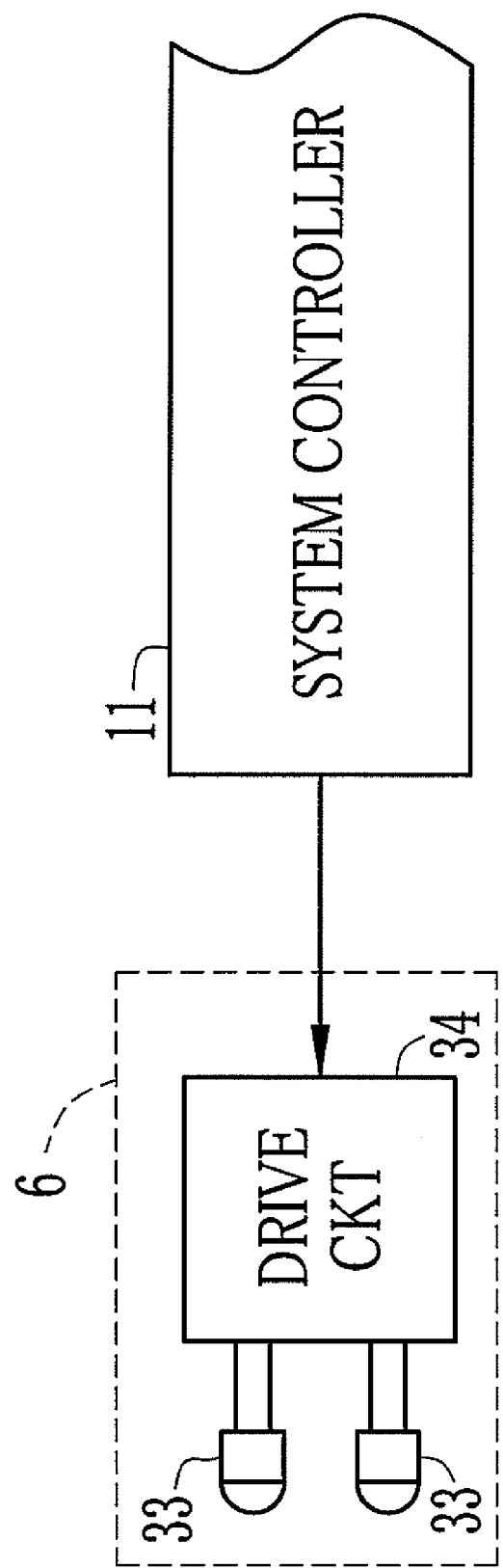
FIG. 20 is a fragmentary diagram illustrating a supplemental light projector capable of raising the amount of AF supplemental light.
Figure 21:
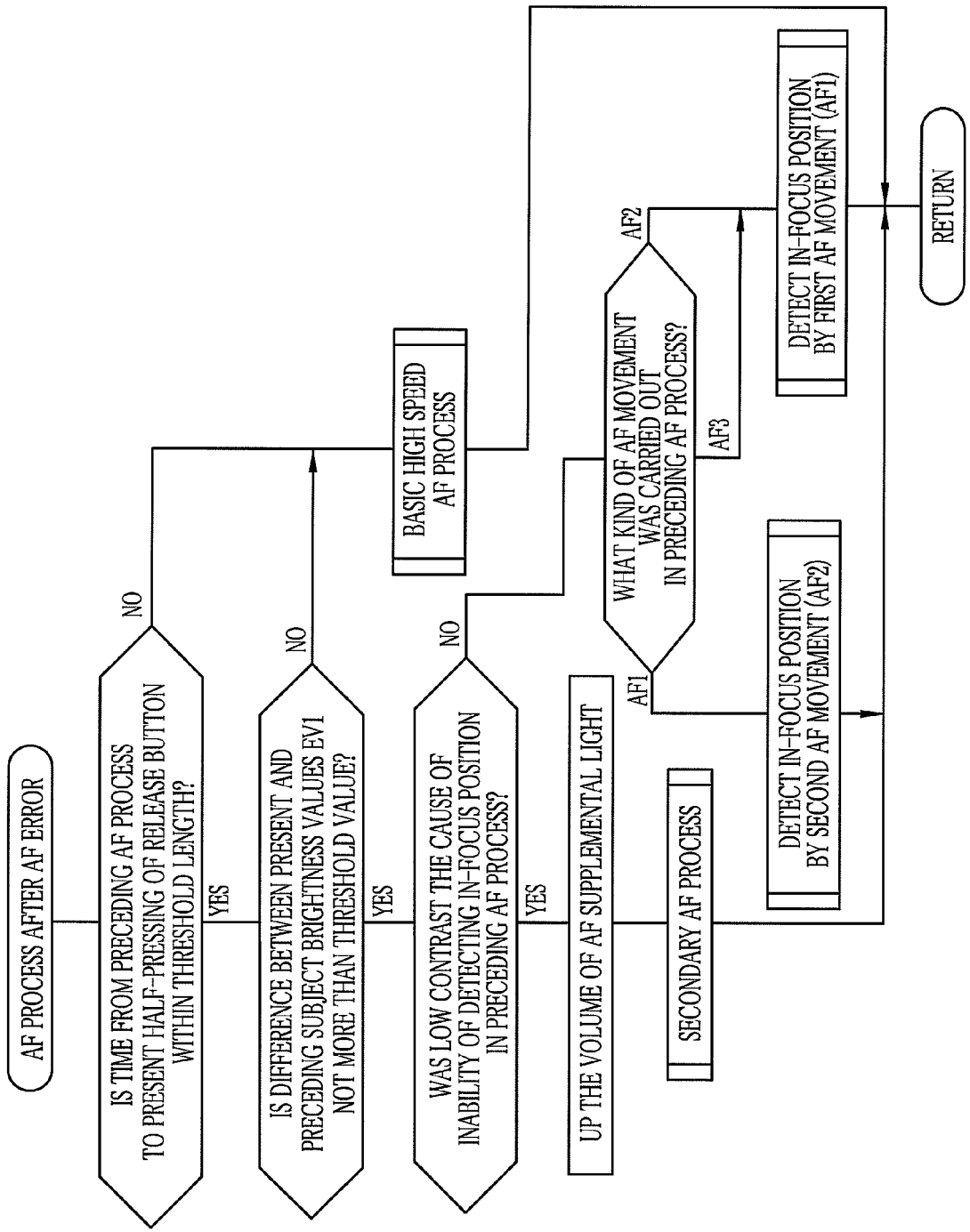
FIG. 21 is a flowchart illustrating another variation of the AF process after AF error, having an option to execute an AF process under the raised amount of AF supplemental light.

According to another embodiment shown in FIGS. 20 and 21, the AF process after AF error, which is carried out when the in-focus position was not detected in the preceding AF process, checks whether the contrast was too low to detect the in-focus position, and if the answer is yes, a secondary AF process is executed with an raised amount of the AF supplemental light. As shown in FIG. 20, a supplemental light projector 6 is provided with a couple of LEDs 33 as the light source, so that a drive circuit 34 drives one or both of the LEDs 33 under the control of the system controller 11. Specifically, only one LED 33 is usually turned on to project the AF supplemental light. However, if the in-focus position was not detected because of the low contrast, both of the LEDs 33 are turned on to increase the amount of the AF supplemental light.

As shown in FIG. 21, the system controller 11 first checks the shift amount of the present composition from the preceding composition by checking whether the length of time passed from the preceding half-pressing to the present half-pressing of the release button 7 is not over a predetermined threshold value and whether the difference between the preceding subject brightness value EV1 and the present subject brightness value EV1 is not more than a predetermined threshold value. If the length of passed time or the difference in subject brightness EV1 is over the threshold value, the system controller 11 judges that the shift amount of the composition is pretty large, and makes the basic high speed AF process. On the contrary, if the system controller 11 judges that the shift amount of the composition is small, the system controller 11 judges whether the reason for inability of detecting the in-focus position in the preceding AF process is low contrast or not. If the answer is no, the system controller 11 chooses a different kind of AF movement from the preceding AF movement, for detecting the in-focus position, as shown in FIG. 21.

If the system controller 11 judges that the reason why the in-focus position was not detected in the preceding AF process is the low contrast, the system controller 11 controls the drive circuit 34 to turn on the two LEDs 33, to project the raised amount of the AF supplemental light. Under the increased AF supplemental light, the secondary AF process is executed. In the secondary AF process, an AF movement is chosen depending upon the lens position of the focus lens 15a. It is alternatively possible to make a different AF movement from the preceding AF movement in the secondary AF process. In either case, the raised amount of AF supplemental light will increase the image contrast and thus raise the probability of detecting the in-focus position.

The judgment as to whether the low contrast was the cause of inability of detecting the in-focus position may be done by comparing the image contrast of the subject with a predetermined level. Concretely, if the AF evaluation value is less than a predetermined value when the in-focus position is not detectable, it is judged that the cause is the low contrast of the subject image.

FIG. 22 shows a further embodiment, wherein an exposure value EV3 that was decided based on the result of the preceding AE process for AF is memorized, and if it is judged that the present composition scarcely different from the preceding one, the AE process for AF is skipped, and the high speed AF process is carried out at the memorized exposure value EV3 obtained by the preceding AE process for AF. By skipping the AE process for AF, the AF process is accomplished faster than usual.

Like the above embodiments, the degree of difference in composition can be determined by the length of time passed from the preceding to the present half-pressing of the release button 7 and the difference between the preceding subject brightness value EV1 and the present subject brightness value EV1. But in this embodiment, it is preferable to use a smaller threshold value for the judgment by the difference in subject brightness EV1 than that used in the above embodiment, so that the AE process for AF will not be skipped unless the difference in composition is very small.

Although the degree of difference in composition is judged by the lapse of time and the difference in subject brightness in the above embodiments, it is also possible to judge the difference in composition by the lens position of the focus lens.

Although the present invention has been described with respect to the digital cameras, the present invention is also applicable to any kind of imaging apparatus insofar as it detect the in-focus position while moving a focus lens in an imaging lens system, as well as to a control method for such an imaging apparatus.

In the above embodiments, both auto-focusing during the period while the release button is not operated and auto-focusing responsive to the release button being operated are carried out in so-called TTL contrast detection method that evaluates the image contrast of the subject formed through the imaging lens. However, the present invention is not limited to these embodiments, but may be applicable to any case insofar as it moves a focus lens to detect the in-focus position in response to an operation on a release button.

For example, it is possible to adopt the TTL phase difference detection method that divides a light bundle from an imaging lens by use of a separator lens to form two images, and detects a deviation of the focus of the imaging lens on the basis of a distance between the two images. It is also possible to adopt a phase difference detection method using an external AF sensor that does not uses an imaging lens. In a case where the external AF sensor is adopted, a focus lens is moved at predetermined intervals or continuously based on the detection result of the external AF sensor, so as to focus on the subject.

In the case where the phase difference detection method is adopted for auto-focusing, the judgment as to whether the imaging lens is in focus to the subject or not is made at each step of the focus lens. Therefore, the lens terminal on the short shooting distance side can be equal to the lens position for the shortest shooting distance, and the lens terminal on the long shooting distance side can be equal to the lens position for the infinity.

Furthermore, the auto-focusing during the period while the release button is not operated can adopt a method different from the method for the auto-focusing responsive to the operation on the release button. For example, the auto-focusing during the period before the operation on the release button may be made by moving the focus lens at predetermined intervals or continuously based on the detection result of an external AF sensor, whereas the auto-focusing responsive to the operation on the release button may be made by detecting the in-focus position by the TTL contrast detection method.

Some kinds of digital cameras, like some single-reflection types, do not make the auto-focusing operation until the release button is operated. The present invention is also applicable to such cameras if the cameras start focusing at predetermined intervals or continuously as soon as it detects some operation or action, e.g. the photographer's looking into a viewfinder.

Thus, the present invention is not to be limited by the above-described embodiments but, on the contrary, various modifications will be possible without departing from the scope of claims appended hereto.

What is claimed is:

1. An imaging apparatus comprising:
   an imaging lens system including a focus lens for adjusting its focal point by moving said focus lens along an optical axis;
   a lens position detector for detecting the position of said focus lens on the optical axis;
   an operating member for inputting a command to prepare for capturing a still image;
   a display device
   a first focus control device for focusing said imaging lens system on a subject by moving said focus lens continuously at predetermined time intervals while said operating member is not operated and camera-through images are displayed on said display device;
   a second focus control device for focusing said imaging lens system on the subject by moving said focus lens in response to the command inputted through said operating member;
   a light projector for projecting an illumination light toward the subject to help said second focus control device detect the in-focus position; and
   a brightness detector for detecting a first subject brightness value without the illumination light and a second subject brightness value under the illumination light in response to an operation on said operating member, wherein said second focus control device decides an initial position and a direction to move said focus lens depending upon the position of said focus lens detected by said lens position detector at the time said operating member is operated as well as a relation in magnitude between the first and second subject brightness values, and moves said focus lens to detect an in-focus position of said focus lens by evaluating focusing condition of said imaging lens system at respective steps of said focus lens.

2. An imaging apparatus as recited in claim 1, wherein when the second subject brightness value under the illumination light is more than the first subject brightness value without the illumination light, or when the second subject brightness value is not more than the first subject brightness value and the position of said focus lens as detected by said lens position detector is closer to a first lens terminal on a short shooting distance side than a second lens terminal on a long shooting distance side, said second focus control device moves said focus lens from the first lens terminal toward the second lens terminal, whereas when the position of said focus lens as detected by said lens position detector is closer to the second lens terminal than the first lens terminal, said second focus control device moves said focus lens from the second lens terminal toward the first lens terminal.

3. An imaging apparatus as recited in claim 2, further comprising an image sensor for converting an optical image of the subject obtained through said imaging lens system into electronic image signals, wherein said second focus control device evaluates the focusing condition on the basis of the image signals.

4. An imaging apparatus as recited in claim 3, further comprising:
   a memory for memorizing the initial position and the direction to move said focus lens as decided by said second focus control device; and
   a judging device for judging whether a present image composition obtained through said image sensor in response to a present operation on said operating member approximates a preceding image composition obtained in response to a preceding operation on said operating member, wherein when said judging device judges that the present image composition approximates the preceding image composition, said second focus control device decides the initial position and the direction to move said focus lens with reference to the initial position and the direction as decided in response to the preceding operation on said operating member and memorized in said memory.

5. An imaging apparatus as recited in claim 4, further comprising a second memory for memorizing the first and second subject brightness values as detected by said brightness detector, wherein said judging device measures length of time passed from a predetermined action responsive to the preceding operation on said operating member to the present operation on said operating member, to judge the proximity between the present image composition and the preceding image composition at least by the length of the passed time and a difference between the first subject brightness value detected in response to the present operation on said operating member and the first subject brightness value detected in response to the preceding operation on said operating member.

6. An imaging apparatus as recited in claim 3, wherein said second focus control device evaluates contrast of the optical image of the subject on the basis of the image signals output from said image sensor, to detect the in-focus position of said focus lens.

7. An imaging apparatus as recited in claim 1, wherein said second focus control device sets said focus lens at the detected in-focus position as soon as it is detected.

8. A focusing method for an imaging lens system including a focus lens movable along an optical axis, comprising steps of:
   focusing said imaging lens system on a subject by moving said focus lens continuously at predetermined time intervals while a command to prepare for capturing a still image is not inputted through an operating member, and displaying camera through-images on a display device during focusing;
   detecting the position of said focus lens on the optical axis when said operating member is operated to input the command;
   projecting an illumination light toward the subject in response to the operation on said operating member;
   detecting a first subject brightness value without the illumination light and a second subject brightness value under the illumination light;

deciding an initial position and a direction to move said focus lens depending upon the position of said focus lens detected at the time said operating member is operated as well as a relation in magnitude between the first and second subject brightness values;

moving said focus lens from the decided initial position in the decided direction;

evaluating focusing condition of said imaging lens system at respective steps of said focus lens, to detect an in-focus position of said focus lens to the subject; and setting said focus lens to the detected in-focus position.

9. A focusing method as recited in claim 8, wherein when the second subject brightness value under the illumination light is more than the first subject brightness value without the illumination light, or when the second subject brightness value is not more than the first subject brightness value and the detected position of said focus lens is closer to a first lens terminal on a short shooting distance side than a second lens terminal on a long shooting distance side, the first lens terminal is decided to be the initial position and said focus lens is moved from the first lens terminal toward the second lens terminal, whereas when the detected position of said focus lens is closer to the second lens terminal than the first lens terminal, the second lens terminal is decided to be the initial position and said focus lens is moved from the second lens terminal toward the first lens terminal.

10. A focusing method as recited in claim 8, wherein the initial position and the direction to move said focus lens are chosen from among a first focusing movement from a first lens terminal on a short shooting distance side toward a second lens terminal on a long shooting distance side, a second focusing movement from the second lens terminal toward the first lens terminal, and a third focusing movement from a lens position for border zone toward the second lens terminal, wherein said lens position for border zone corresponds to a shooting distance beyond which the illumination light cannot effectively reach.

11. A focusing method as recited in claim 10, wherein the first focusing movement is chosen when the second subject brightness value under the illumination light is more than the first subject brightness value without the illumination light, the second focusing movement is chosen when the second subject brightness value is not more than the first subject brightness value and the detected position of said focus lens is closer to the second lens terminal than the first lens terminal, and the third focusing movement is chosen when the second subject brightness value is not more than the first subject brightness value and the detected position of said focus lens is on the short shooting distance side of the lens position for border zone.

12. A focusing method as recited in claim 8, further comprising steps of:

memorizing the initial position and the direction to move said focus lens as decided in response to a preceding operation on said operating member; and judging whether a present image composition obtained in response to a present operation on said operating member approximates a preceding image composition obtained in response to the preceding operation on said operating member, whereby when it is judged that the present image composition approximates the preceding image composition, the initial position and the direction to move said focus lens are decided with reference to the memorized initial position and direction.

13. A focusing method as recited in claim 12, further comprising steps of:

calculating a difference between the first subject brightness value as detected in response to the present operation on said operating member and the first subject brightness value as detected in response to the preceding operation on said operating member; and measuring length of time passed from a predetermined action responsive to the preceding operation on said operating member to the present operation on said operating member, whereby the proximity between the present image composition and the preceding image composition is judged on the basis of the length of passed time and the difference between the first subject brightness values.

14. A focusing method as recited in claim 13, further comprising steps of:

memorizing an in-focus position as detected in response to the preceding operation on said operating member;

calculating a difference between the second subject brightness value as detected in response to the present operation on said operating member and the second subject brightness value as detected in response to the preceding operation on said operating member; and comparing the length of passed time, the difference between the first subject brightness values and the difference between the second subject brightness values with respective threshold values, whereby if these values are not more than the threshold values, said focus lens is moved only within a limited range defined around the memorized in-focus position in the same direction as the memorized direction as decided in response to the preceding operation on said operating member.

15. A focusing method as recited in claim 12, further comprising a step of controlling an exposure value on detecting the in-focus position under the illumination light on the basis of the second subject brightness value as detected under the illumination light, wherein if it is judged that the present image composition approximates the preceding image composition, detection of the second subject brightness value is not carried out in response to the present operation on said operating member, and the exposure value is controlled on the basis of the second subject brightness value as detected in response to the preceding operation on said operating member.

16. A focusing method as recited in claim 12, further comprising a step of checking whether an in-focus position was detected in response to the preceding operation on said operating member, wherein when it is determined that the in-focus position was detected in response to the preceding operation and that the present image composition approximates the preceding image composition, said focus lens is moved from the same initial position in the same direction as decided in response to the preceding operation on said operating member.

17. A focusing method as recited in claim 16, wherein when it is determined that no in-focus position was detected in response to the preceding operation and that the present image composition approximates the preceding image composition, said focus lens is moved from a different initial position in a different direction from those decided in response to the preceding operation on said operating member.

18. A focusing method as recited in claim 16, wherein when it is determined that no in-focus position was detected in response to the preceding operation and that the present image composition approximates the preceding image composition, said focus lens is moved to detect the in-focus position under a raised amount of the illumination light.

* * * * *